United States Patent
Fiseni et al.

(10) Patent No.: US 9,941,775 B2
(45) Date of Patent: *Apr. 10, 2018

(54) D-RING IMPLEMENTATION IN SKEWED ROTOR ASSEMBLY

(71) Applicant: GENERAL ELECTRIC COMPANY, Schenectady, NY (US)

(72) Inventors: Alexander Felix Fiseni, Munich (DE); Kum-Kang Huh, Niskayuna, NY (US); Mohamed Osama, Garching (DE); Francesco Papini, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 974 days.

This patent is subject to a terminal disclaimer.

(21) Appl. No.: 14/085,953

(22) Filed: Nov. 21, 2013

(65) Prior Publication Data
US 2014/0117791 A1 May 1, 2014

Related U.S. Application Data

(63) Continuation-in-part of application No. 14/019,630, filed on Sep. 6, 2013, now Pat. No. 9,641,033, which
(Continued)

(51) Int. Cl.
*H02K 1/26* (2006.01)
*H02K 1/27* (2006.01)
(Continued)

(52) U.S. Cl.
CPC ............ *H02K 15/03* (2013.01); *H02K 1/223* (2013.01); *H02K 1/246* (2013.01); *H02K 1/28* (2013.01);
(Continued)

(58) Field of Classification Search
CPC ........ H02K 1/223; H02K 1/246; H02K 21/04; H02K 21/042; H02K 1/27; H02K 1/28
(Continued)

(56) References Cited

U.S. PATENT DOCUMENTS

| 4,139,790 A | 2/1979 | Steen | |
| 4,454,438 A * | 6/1984 | Yamashita | H02K 21/46 310/156.81 |

(Continued)

FOREIGN PATENT DOCUMENTS

| CN | 102005883 A | 4/2011 |
| EP | 1689066 A2 | 8/2006 |

(Continued)

OTHER PUBLICATIONS

Canadian Office Action issued in connection with corresponding CA Application No. 2869835 dated Jan. 5, 2016.
(Continued)

*Primary Examiner* — Thomas Truong
(74) *Attorney, Agent, or Firm* — Pabitra K. Chakrabarti

(57) ABSTRACT

An assembly includes multiple adjoined rotor sections each having multiple poles and multiple void rows therethrough that are radially distributed in each of the poles. The rotor sections are skewed in a circumferential direction. The assembly also has multiple conductive rings that substantially surround one of the void rows. A method of assembly and electric machines and vehicles using the assembly are also disclosed. Aspects reduce torque ripple in electric machines and allow for encoderless/sensorless operation in an electric machine using the rotor assembly. The present invention has been described in terms of specific embodiment(s), and it is recognized that equivalents, alternatives, and modifications, aside from those expressly stated, are possible and within the scope of the appending claims.

31 Claims, 27 Drawing Sheets

Related U.S. Application Data is a continuation-in-part of application No. 13/666,283, filed on Nov. 1, 2012, now Pat. No. 9,093,878.

(51) Int. Cl.
  *H02K 1/28* (2006.01)
  *H02K 15/03* (2006.01)
  *H02K 29/03* (2006.01)
  *H02K 29/12* (2006.01)
  *H02K 1/22* (2006.01)
  *H02K 1/24* (2006.01)
  *H02K 3/20* (2006.01)

(52) U.S. Cl.
  CPC ............. *H02K 3/20* (2013.01); *H02K 29/03* (2013.01); *H02K 29/12* (2013.01); *H02K 2201/06* (2013.01); *Y10T 29/49012* (2015.01)

(58) Field of Classification Search
  USPC .... 310/181, 49.35, 156.13, 156.09, 216.123, 310/402, 156.47
  IPC ................................................ H02K 1/27, 1/28
  See application file for complete search history.

(56) References Cited

U.S. PATENT DOCUMENTS

| | | | |
|---|---|---|---|
| 4,490,638 A * | 12/1984 | Lind | F16F 15/32 310/194 |
| 4,631,435 A | 12/1986 | McCarty | |
| 5,565,752 A | 10/1996 | Jansen et al. | |
| 5,585,709 A | 12/1996 | Jansen et al. | |
| 5,886,440 A | 3/1999 | Hasebe et al. | |
| 5,886,498 A | 3/1999 | Sul et al. | |
| 5,936,323 A | 8/1999 | Shibukawa et al. | |
| 6,058,596 A | 5/2000 | Jansen et al. | |
| 6,069,467 A | 5/2000 | Jansen | |
| 6,137,258 A | 10/2000 | Jansen | |
| 6,388,420 B1 | 5/2002 | Jansen et al. | |
| 6,515,395 B1 | 2/2003 | Jansen | |
| 6,639,380 B2 | 10/2003 | Sul et al. | |
| 6,707,209 B2 | 3/2004 | Crapo et al. | |
| 6,763,622 B2 | 7/2004 | Schulz et al. | |
| 6,801,011 B2 | 10/2004 | Ide | |
| 6,822,418 B2 | 11/2004 | Harke | |
| 6,847,144 B1 | 1/2005 | Luo | |
| 6,867,524 B2 | 3/2005 | Liang | |
| 6,874,221 B2 | 4/2005 | Jansen et al. | |
| 6,876,115 B2 | 4/2005 | Takahashi et al. | |
| 6,894,454 B2 | 5/2005 | Patel et al. | |
| 6,924,617 B2 | 8/2005 | Schulz et al. | |
| 6,967,461 B1 | 11/2005 | Markunas et al. | |
| 6,975,050 B2 * | 12/2005 | Cleanthous | H02K 3/47 310/152 |
| 7,034,423 B2 | 4/2006 | Crapo et al. | |
| 7,045,988 B2 | 5/2006 | Ha et al. | |
| 7,088,077 B2 | 8/2006 | Nagashima et al. | |
| 7,190,130 B2 | 3/2007 | Wogari et al. | |
| 7,245,054 B1 | 7/2007 | Walls et al. | |
| 7,342,338 B2 | 3/2008 | Miyazaki et al. | |
| 7,348,749 B2 | 3/2008 | Ide et al. | |
| 7,541,710 B2 | 6/2009 | Nemoto et al. | |
| 7,679,308 B2 | 3/2010 | Tomigashi | |
| 7,768,220 B2 | 8/2010 | Schulz et al. | |
| 7,902,710 B2 | 3/2011 | Han et al. | |
| 7,902,711 B2 | 3/2011 | Blissenbach et al. | |
| 7,969,058 B2 | 6/2011 | Rahman et al. | |
| 8,018,109 B2 | 9/2011 | Leonardi et al. | |
| 8,035,273 B2 | 10/2011 | Jonel et al. | |
| 8,067,872 B2 | 11/2011 | Pedersen et al. | |
| 8,129,881 B2 | 3/2012 | Hosle | |
| 8,217,545 B2 | 7/2012 | Kawasaki et al. | |
| 8,228,013 B2 | 7/2012 | Liu et al. | |
| 8,378,534 B2 | 2/2013 | Houle et al. | |
| 8,405,269 B2 | 3/2013 | Spaggiari | |
| 8,436,504 B2 | 5/2013 | Liang et al. | |
| 8,508,094 B2 | 8/2013 | Matt et al. | |
| 8,536,748 B2 | 9/2013 | Liang et al. | |
| 9,093,878 B2 | 7/2015 | Huh et al. | |
| 9,641,033 B2 * | 5/2017 | Papini | H02K 1/28 |
| 2002/0140307 A1 * | 10/2002 | Yanashima | H02K 1/276 310/154.28 |
| 2003/0209950 A1 | 11/2003 | Biais et al. | |
| 2004/0256944 A1 | 12/2004 | Kaneko | |
| 2005/0140236 A1 * | 6/2005 | Jeong | H02K 1/2766 310/156.53 |
| 2008/0129243 A1 | 6/2008 | Nashiki | |
| 2009/0184598 A1 | 7/2009 | Nakano | |
| 2009/0224624 A1 | 9/2009 | Kumar et al. | |
| 2009/0315505 A1 | 12/2009 | Denk et al. | |
| 2011/0031843 A1 | 2/2011 | Liang et al. | |
| 2011/0074231 A1 | 3/2011 | Soderberg | |
| 2011/0080068 A1 | 4/2011 | Dawson et al. | |
| 2011/0304235 A1 * | 12/2011 | Hashiba | H02K 1/02 310/156.76 |
| 2012/0062160 A1 | 3/2012 | Yang et al. | |
| 2012/0235533 A1 | 9/2012 | Tanaka et al. | |
| 2013/0093369 A1 | 4/2013 | Leonardi et al. | |
| 2013/0119810 A1 | 5/2013 | Aoyama | |
| 2013/0154426 A1 | 6/2013 | Melfi et al. | |
| 2014/0117791 A1 | 5/2014 | Fiseni et al. | |
| 2015/0069863 A1 | 3/2015 | Papini et al. | |
| 2015/0069879 A1 | 3/2015 | Papini et al. | |
| 2015/0084471 A1 | 3/2015 | Huh et al. | |
| 2016/0105064 A1 | 4/2016 | Huh et al. | |

FOREIGN PATENT DOCUMENTS

| | | | | |
|---|---|---|---|---|
| EP | 1850456 A2 | 10/2007 | | |
| JP | 62193537 A | 8/1987 | | |
| JP | 2002238194 A | 8/2002 | | |
| JP | 2004248443 A | 9/2004 | | |
| JP | 2011055641 A | 3/2011 | | |
| RU | 2167481 C1 | 5/2001 | | |
| RU | 2406209 C2 | 12/2008 | | |
| RU | 119541 U1 | 8/2012 | | |
| WO | WO 2010070888 A1 * | 6/2010 | | H02K 1/02 |
| WO | 2012129799 A1 | 10/2012 | | |

OTHER PUBLICATIONS

PCT Search Report and Written Opinion issued in connection with related PCT Application No. PCT/US2014/053386 dated Jun. 3, 2015.

Ha et al., "Physical Understanding of High Frequency Injection Method to Sensorless Dives of an Induction Machine", Conference Record of the 2000 IEEE Industry Applications Conference, vol. 3, pp. 1802-1808, 2000.

Jang et al., "Sensorless Drive of Surface-mounted Permanent-magnet Motor by High-Frequency Signal Injection Based on Magnetic Saliency", IEEE Transactions on Industry Applications, vol. 39, Issue 4, pp. 1031-1039, Jul.-Aug. 2003.

Cupertino et al., "Sensorless Control of Linear Tubular Permanent Magnet Synchronous Motors Using Pulsating Signal Injection", IEEE Industry Applications Society Annual Meeting IAS '08, pp. 1-8, Oct. 5-9, 2008.

Jin Wang et al., "Cogging torque reduction in interior permanent magnet brushless dc motor with flux-concentration type rotor", Electrical Machines and Systems, 2009. ICEMS 2009. International Conference on, IEEE, pp. 1-6; Conference Location: Tokyo, Nov. 15-18, 2009.

Changjiang Fu et al., The design of Interior Permanent Magnet brushless motor control system based on finite element method, Informatics in Control, Automation and Robotics (CAR), 2010 2nd International Asia Conference on, IEEE, vol. 3; pp. 130-133; Conference Location: Wuhan, Mar. 6-7, 2010.

Kang, "Sensorless Control of Permanent Magnet Motors", Control Engineering, vol. 57, Issue 4, Apr. 2010.

(56) References Cited

OTHER PUBLICATIONS

Yang et al., "Surface Permanent Magnet Synchronous Machine Design for Saliency-Tracking Self-Sensing Position Estimation at Zero and Low Speeds", IEEE Energy Conversion Congress and Exposition (ECCE), pp. 3493-3500, Sep. 12-16, 2010.
Office Action and Search Report issued in connection with AU Application No. 2014259500 dated Jun. 18, 2015.
Unofficial English translation of Office Action issued in connection with KZ Application No. 20142531.1 dated Jan. 7, 2016.
W. Fei et al., "Comparison of cogging Torque Reduction in Permanent Magnet Brushless Machines by conventional and Herringbone Skewing Techniques," IEEE Transactions of Energy Conversion, vol. 28, No. 3, Sep. 2013, pp. 664-674.
PL Search Report issued in connection with corresponding Application No. P41091 dated Mar. 4, 2015.
A Faggion et al., "Ringed-Pole Permanent-Magnet Synchronous Motor for Position Sensorless Drives," IEEE Transactions on Industry Application, vol. 47, No. 4, Jul./Aug. 2011, pp. 1759-1766.
S. Han et al., "Design Tradeoffs between Stator Core Loss and Torque Ripple in IPM Machines," IEEE Industry Applications Society Annual Meeting, Oct. 5-9, 2008, pp. 1-8.
A. Faggion et al., "Sensorless Capability of Fractional-Slot Surface-Mounted PM Motors," IEEE Transactions on Industry Applications, vol. 49, No. 3, May/Jun. 2013, pp. 1325-1332.
C. Wang et al., "A Permanent Magnet Integrated Starter Generator for Electric Vehicle Onboard Range Extender Application," IEEE Transactions on Magnetics, vol. 48, No. 4, Apr. 2012, pp. 1625-1628.
M. Barcaro et al., Predicted and Experimental Anisotropy of a Dual Three-Phase Interior Permanent Magnet Motor for Sensorless Rotor Position Control, Power Electronics Machines and Drives, 2012, 6th IET International Conference, Mar. 2012, pp. 12-6.
N. Bianchi et al., "Analysis and Experimental Tests of the Sensorless Capability of a Fractional-Slot Inset PM Motor," Sensorless Control for Electrical Drives (SLED), 2012 IEEE Symposium, Sep. 2012, pp. 1-6.
T. Marcic, Comparison of Induction Motor and Line-Start IPM Synchronous Motor Performance in a Variable-Speed Drive, IEEE Transactions on industry Applications, vol. 48, No. 6, Nov./Dec. 2012, pp. 2341-2352.
Canadian Office Action issued in connection with corresponding CA Application No. 2869835 dated Aug. 2, 2017.
U.S. Non-Final Office Action issued in connection with related U.S. Appl. No. 14/313,380 dated Dec. 15, 2016.
U.S. Non-Final Office Action issued in connection with related U.S. Appl. No. 14/559,037 dated Jan. 13, 2017.
U.S. Final Office Action issued in connection with related U.S. Appl. No. 14/559,037 dated May 19, 2017.
U.S. Final Office Action issued in connection with related U.S. Appl. No. 14/313,380 dated Jun. 13, 2017.

\* cited by examiner

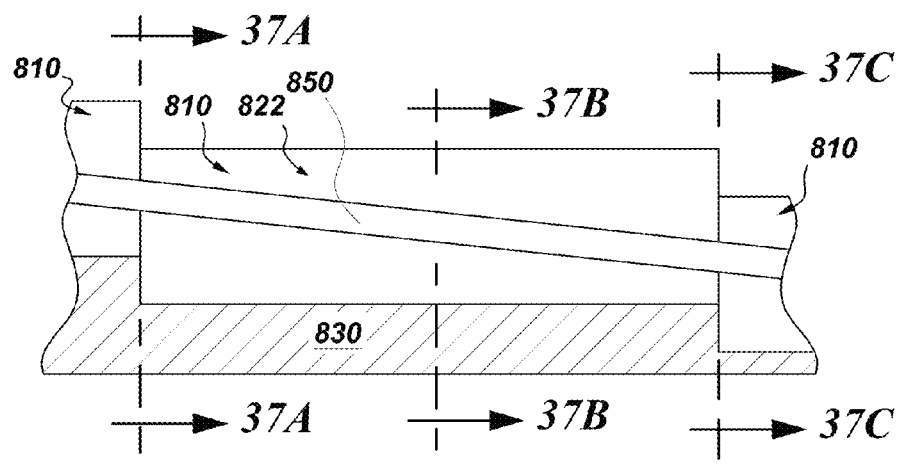
*Fig. 36*
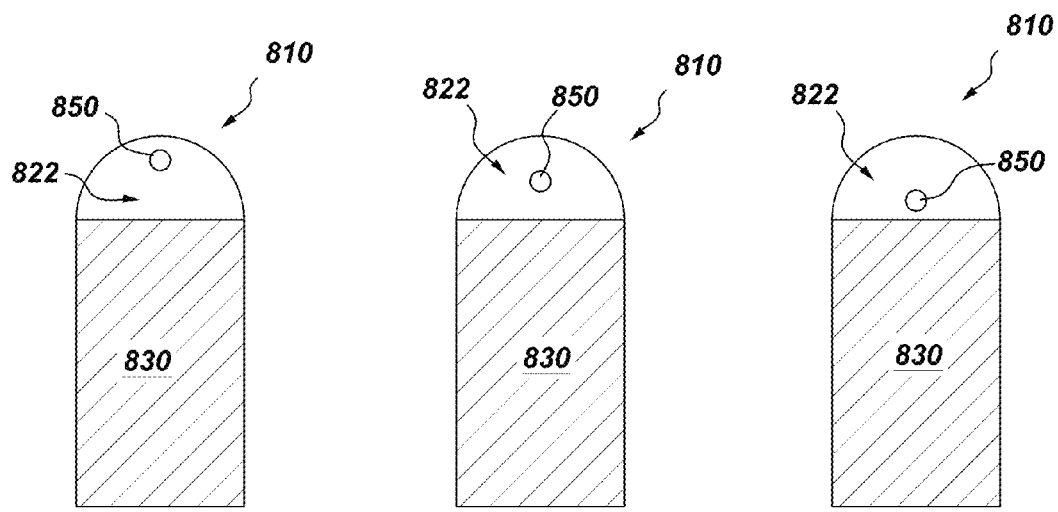
*Fig. 37A*  *Fig. 37B*  *Fig. 37C*

D-RING IMPLEMENTATION IN SKEWED ROTOR ASSEMBLY

CROSS REFERENCE TO RELATED APPLICATIONS

This Continuation-In-Part (C.I.P.) application claims the benefit of the Sep. 6, 2013 filing date of U.S. application Ser. No. 14/019,630 (Entitled: ELECTRIC MACHINE HAVING OFFSET ROTOR SECTIONS, as amended). This C.I.P. application also claims the benefit of the Nov. 1, 2012 filing date of U.S. application Ser. No. 13/666,283 (Entitled: SENSORLESS ELECTRIC MACHINE). Both of the aforementioned applications are incorporated herein by reference in their entirety.

BACKGROUND OF THE INVENTION

The present invention relates generally to electric machines and, more particularly, to implementations for sensorless electric machines that have skewed rotor sections.

One general application for electric machines, and interior permanent magnet (IPM) machines, in particular, is for use in underground mining vehicles, wherein typically electric wheel motors (e.g., IPM) are connected to the wheels via a gearbox. This application typically requires very high torque at low speeds and yet maintenance of the rated power over a very wide speed range (e.g., on the order of 15:1).

IPM machines unfortunately suffer from both a manufacturing and a technical (i.e., electro-mechanical) shortcoming. With IPM machines, permanent magnets typically are inserted into slots in the rotor structure and pushed entirely through the entire slot depth in order to fill the entire stack length. Due to small clearances between the magnets and the slots in the laminations, and the unevenness of such slots along the entire length, the magnets and/or laminations may be damaged during this insertion process.

Further, depending on their magnitude, torque "ripple", or torque oscillations, of the IPM or with Synchronous Reluctance machines, may result in damage to the rotor, the gearbox, and/or the mechanical system(s) connected to the electric machines (due to fatigue or excessive torque). Additionally, the frequency of the torque ripple might excite resonant modes of the mechanical system(s), further posing an additional threat to the electric machines and/or surrounding systems.

Various attempts at reducing torque ripple have included modifying the stator, via stator skewing with a continuous skewing arrangement. This methodology suffers from an undesirable increase in manufacturing cost and complexity. For example, this can cause an additional complexity with the inserting of coils into the slots. Another countervailing trend in reducing torque ripple is using an odd number of stator slots per pole pair. While this method has proven effective in helping reduce torque ripple, it suffers from the undesirable tradeoff of increasing core losses, which, in turn, may harm efficiency.

Further with an electric machine, be it at the IPM machine, permanent magnet (PM) assisted synchronous reluctance machine, or the synchronous reluctance machine, position is a critical informational element for torque control. Typically, an encoder, tachometer, or resolver is used with electric machines as the position sensor.

However, the position sensor (e.g., encoder) along with its cabling and interface electronics contributes a significant portion of the motor drive system cost and overall complexity and is often a major reliability concern. Since the advent of the high frequency injection method for zero frequency encoderless control, encoderless controls have seen great improvements but none have found success in recovering the full, or near full, torque capability of the machine. This is due to loss of small signal saliency at high-load levels for the machine.

Accordingly, there is an ongoing need for improving on current electric machine technologies and/or manufacturing thereof that address at least one of complexity, cost, efficiency, and/or performance without some of the current tradeoffs encountered with current methodologies.

BRIEF DESCRIPTION

The present invention addresses at least some of the aforementioned drawbacks by providing improvements to electric machines, such as an interior permanent magnet (IPM) machines and Synchronous Reluctance motors, such that the electric machines may be both manufactured more efficiently and/or operate with more technical efficiency. More specifically, the present invention is directed to D-ring implementation of a skewed rotor sections that may be used in electric machines, and then, in turn, vehicles. Further aspects of the present invention include components and assemblies that provide for the skewed features of these electric machines. In an embodiment, a vehicle, such as an underground mining vehicle, may employ compact traction motors that utilize aspects of the present invention.

Therefore, in accordance with one aspect of the invention, an assembly comprises a plurality of adjoined rotor sections having a plurality of poles, further having a plurality of void rows therethrough, wherein the plurality of layers are radially distributed in each of the plurality of poles, wherein the plurality of rotor sections are skewed in a circumferential direction; and, a plurality of conductive rings, wherein a portion of each of the plurality of conductive rings substantially surround one of the plurality of void rows.

According to another aspect of the present invention, a method comprises providing a plurality of rotor sections, each having a plurality of void rows; adjoining the plurality of rotor sections to each other in a skewed configuration; and, inserting a plurality of conductive element through the plurality of void rows; and, connecting the conductive elements to each other thereby defining a plurality of conductive rings, wherein a magnetic axis of the plurality of conductive rings coincides with a d-axis of the plurality of rotor sections, further wherein each of the plurality of conductive rings is short-circuited.

According to another aspect of the present invention, a motor comprising a rotor assembly comprising: a plurality of rotor sections, wherein the plurality of rotor sections are skewed in a circumferential direction, having a plurality of voids therethrough; and a plurality of conductive rings, wherein a magnetic axis of each of the plurality of conductive rings is coincident with a d-axis of the plurality of rotor sections; and a stator assembly one of: surrounding the rotor assembly; surrounded by the rotor assembly; and adjacent the rotor assembly.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 36 is a sectional view of a portion of a rotor assembly having a step skewed configuration, according to an embodiment of the present invention.

FIGS. 37A-37C are sectional views of certain portions of the rotor assembly embodiment shown in FIG. 36.

DETAILED DESCRIPTION

Figure 1:
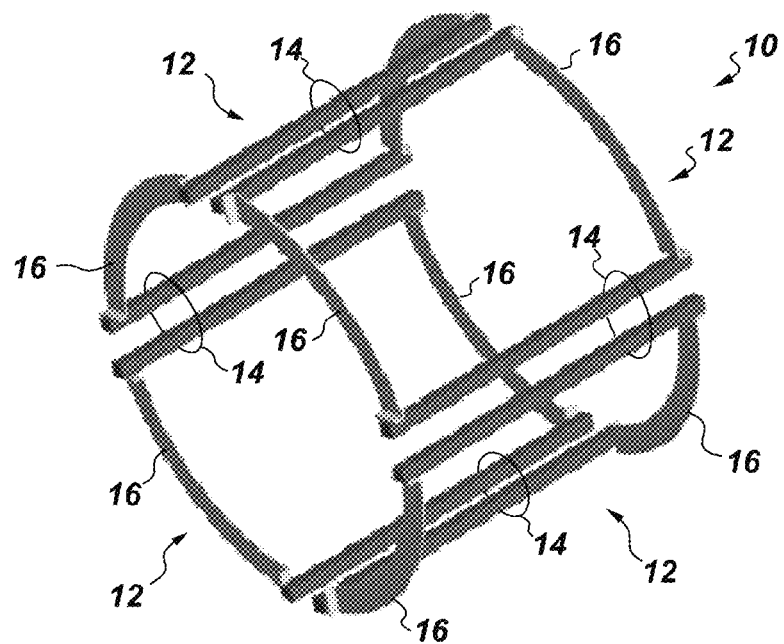
FIG. 1 is a perspective view of a rotor circuit structure component according to an embodiment of the present invention.

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

As used herein, the terms "D-axis", "d-axis", or "direct axis" of the rotor means the axis that is aligned with the center of the magnetic pole of the rotor.

As used herein, the term "Pole Circuit" means one or more circuits that is affiliated with one pole of the electric machine. The one or more circuits may comprise one ring/loop, multiple rings/loops, one loop/ring of a cage, or one loop/ring of a cage with one or more inner rings/loops. The cage may be a shifted or non-shifted cage. Rings/loops may be shifted or non-shifted.

As used herein, the term "Shifted Cage" means one or more connected rings or loops wherein a rotor conductor (or if more than one rotor conductor are adjacent, then a midpoint between the plurality of adjacent rotor conductors) is not aligned with a q-axis of the machine, but instead is shifted by a distance from the q-axis. Contrastingly, a cage that is not shifted has a rotor conductor (or if more than one rotor conductor are adjacent, then a midpoint between the plurality of adjacent rotor conductors) that is aligned with the q-axis of the machine.

Aspects of the present invention have been shown to offer advantages over previous electric machine constructs. Aspects of the present invention provide design features for an electric machine (e.g., IPM motor) that enables full torque control without the use of any position sensor. An aspect of the present invention includes the use of a component, termed herein a special rotor structure that introduces magnetic saliency for high frequency excitation, wherein this high frequency excitation can be used for sensorless (e.g., encoderless) motor control. The rotor structure introduces electrical circuits (shorted circuit, closed circuit with passive or active elements) to specific orientation of the rotor so that it couples with the stator winding magnetically. The position of the rotor is measured by applying high frequency carrier voltage to the stator and by indirectly measuring the current of the rotor, by measuring the (reflected) high frequency carrier current response in the stator. If the rotor circuit is aligned in phase with the high frequency injection the impedance of the motor is reduced. This variation of impedance is used to track rotor position. As a result, small signal saliency up to necessary loading level is introduced and maintained without impact on electric machine performance, efficiency, and reliability.

Referring to FIG. 1 a rotor circuit or electrical component 10 incorporating aspects of the present invention is shown. The component 10 may comprise one or more rotor conductors (e.g., rotor bars 14) connected to one or more connection elements 16. As shown, the rotor bars 14 are substantially longitudinal in configuration. As will be discussed herein the component 10 and the rotor bars 14 and connection elements 16 are configured so as to substantially surround permanent magnets 40 located in an electric machine 100. In this manner two or more rotor bars 14 are connected to two or more connection elements 16 such that they define a loop or ring 12. While the embodiment in FIG. 1 clearly shows a quantity of four rings 12 each ring 12 comprising two rotor bars 14 and two connection elements 16, other quantities and configurations of elements of the component 10 are suitable without departing from the present invention. For example, the component 10 may comprise four rotor bars 14 and a plurality of connection elements 16 are either end of the component 10, thereby defining a cage 13. Similarly, in another embodiment, the component 10 may comprise a plurality of loops or rings 12, wherein each ring 12 comprises four rotor bars 14 and two connection elements 16. In still other embodiments, the ring(s) 12 and/or cage 13 may comprise virtually any quantity of conductors and/or connection elements.

The rotor bars 14 and connection elements 16 may be made of any suitable conductive, non-magnetic material, or combinations thereof. By example but not limitation, the rotor bars 14 and connection elements 16 may be castings made of aluminum, copper, alloys of copper or aluminum, or other suitable material or combination of materials.

It should be noted that although several of the embodiments discussed herein discuss the use of rotor bars, other conductive elements may be used in the component 10 without departing from the invention. For example, any suitable rotor conductor may be substituted in lieu of the rotor bars 14 that are discussed herein for the various embodiments. Other conductive elements for use in lieu of the rotor bars 14 and/or the connection elements 16 include, but are not limited to, one or more of multistranded bars, multi-stranded wire, litz wire, and combinations thereof.

Similarly, the rotor bar 14 has a cross-sectional shape that is suitable to address design factors including skin effect, cooling surface, structural strength, EM fitness, and the like. Suitable shapes for the cross-section of the rotor bar include a circle, square, rectangle, and the like.

Figure 2:
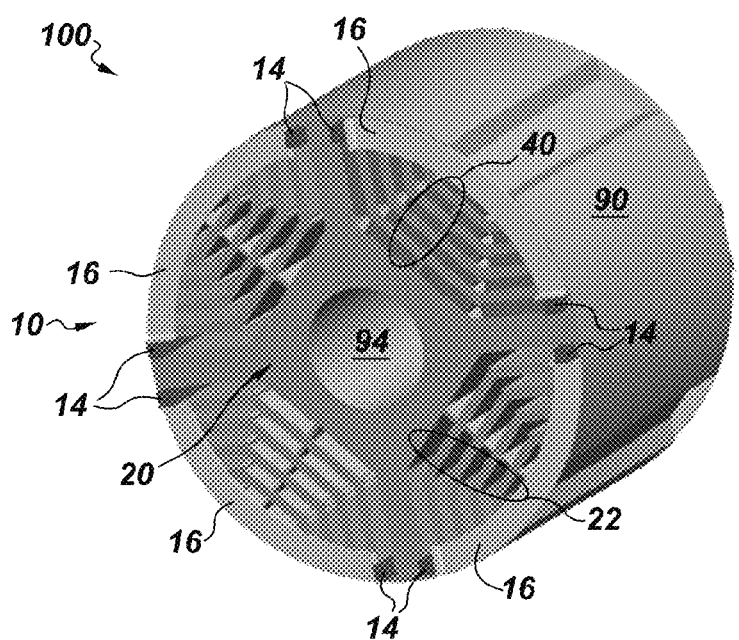
FIG. 2 is a perspective view of rotor core of an electric machine incorporating a rotor circuit structure component according to an embodiment of the present invention.

The end perspective view of another embodiment of the component 10 located in rotor portion of a motor 100 is shown in FIG. 2. The motor 100 includes a plurality of rotor core laminations 20 stacked so as to form a rotor core 90. As shown, in the end view where a cover plate is omitted for illustrative purposes only so as to allow a first rotor core lamination 20 to be viewed. The rotor core lamination 20 includes a plurality of openings 22. Permanent magnets 40 may be located within the plurality of openings 22. For illustrative purposes only the permanent magnets 40 are shown disposed in only one set (e.g., at one pole) of openings 22. The other three sets of openings 22 (i.e., four-pole machine) are shown without permanent magnets 40 therein. At the center of the rotor core lamination 20 is a shaft opening 94 configured to receive a rotatable shaft (not shown). As depicted, the component 10 is similar to the embodiment shown in FIG. 1 and comprises a quantity of four rings or loops 12, each comprising two rotor bars 14 connected to two connection elements 16. In this manner, two of the rotor bars 14 and the two connection elements 16 are interconnected so as to form a rotor ring or loop 12. Four rotor rings or loops 12 are formed as part of the component 10 in this manner so as to match the quantity of poles (i.e., four) in the embodiment of the motor shown 100.

Figure 3A:
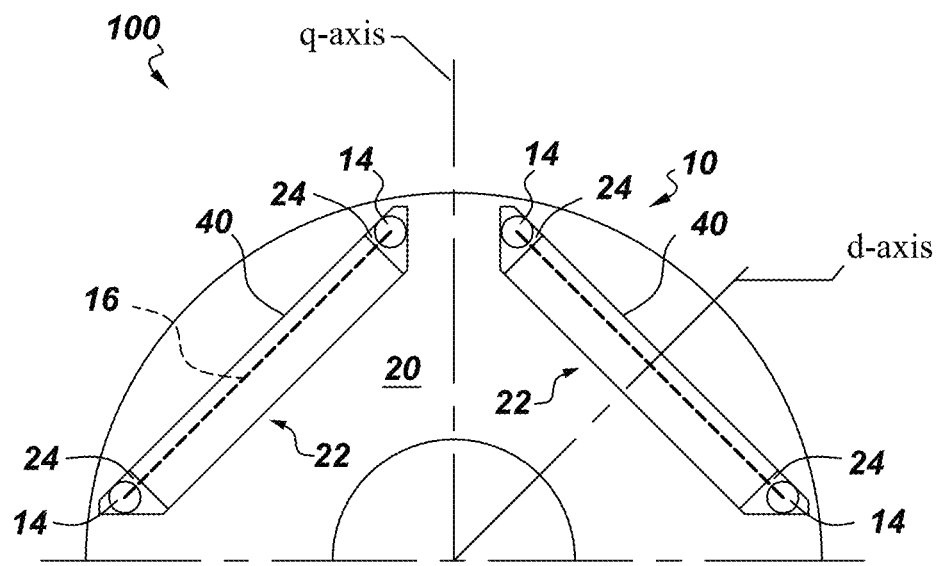
FIG. 3A is a top view of a portion of a rotor lamination and rotor circuit structure component according to an embodiment of the present invention.
Figure 3B:
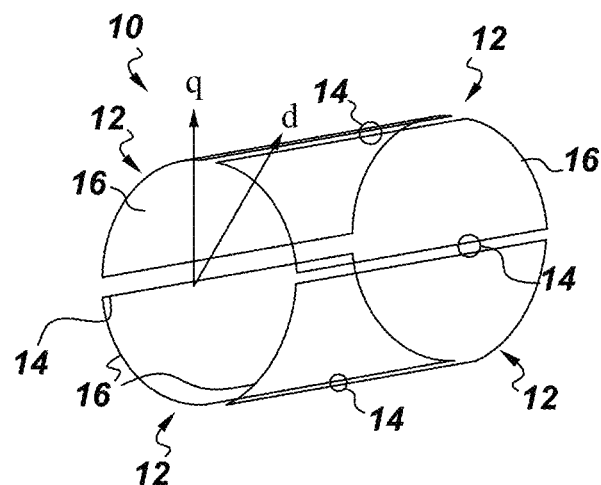
FIG. 3B is a schematic perspective diagram of the rotor circuit structure component in FIG. 3A according to an embodiment of the present invention.

Referring collectively to FIGS. 3A and 3B, a top view of a portion of a rotor lamination 20 portion of an electric machine 100 with a component 10 and a schematic diagram of a perspective view of the component 10 from FIG. 3A are shown respectively. FIG. 3A depicts a rotor lamination 20 of a single layer, four-pole IPM 100 having straight permanent magnets 40 therein. FIG. 3B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 3B has four rotor loops 12 each constructed of two rotor bars 14 and two connection elements 16, thereby matching the quantity of poles (i.e., four) for the particular machine 100.

Figure 4A:
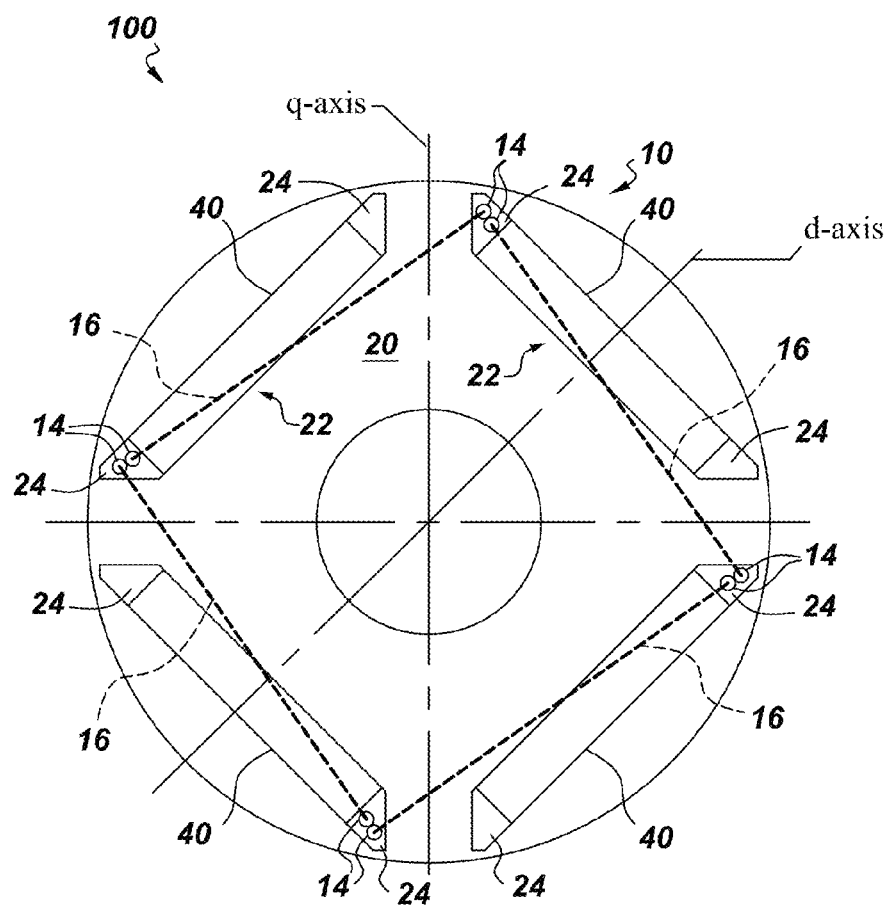
FIG. 4A is a top view of a portion of a rotor lamination and rotor circuit structure component according to another embodiment of the present invention.
Figure 4B:
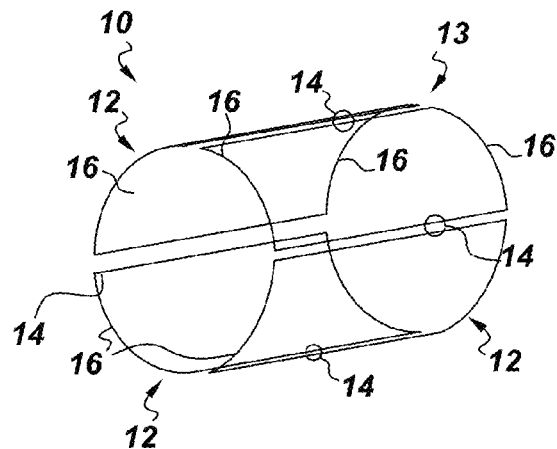
FIG. 4B is a schematic perspective diagram of the rotor circuit structure component in FIG. 4A according to an embodiment of the present invention.

Referring collectively to FIGS. 4A and 4B, a top view of a portion of a rotor lamination 20 portion of an electric machine 100 with a component 10 and a schematic diagram of a perspective view of the component 10 from FIG. 4A are shown respectively. FIG. 4A depicts a rotor lamination 20 of a single layer, four-pole IPM 100 having straight permanent magnets 40 therein. FIG. 4B depicts a rotor component 10 that may be termed a four-loop, shifted-ring configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in some of the plurality of openings 24 longitudinally through the stack of rotor laminations 20. In this embodiment two adjacent rotor bars 14 are co-located in a single opening 24 while the opening 24 at the other end of the magnet 40 is left unfilled. At or near either end of the stack of rotor laminations 20 are connection elements 16 that are connected to both ends of the rotor bars 14. In this manner, the component 10 embodiment in FIG. 4B has four rotor loops 12 each constructed of two rotor bars 14 and two connection elements 16, thereby matching the quantity of poles (i.e., four) for the particular machine 100. By co-locating the two rotor bars 14 from adjacent poles, the four loops 12 are effectively connected to each other, thereby forming shifted rings 13.

Figure 5A:
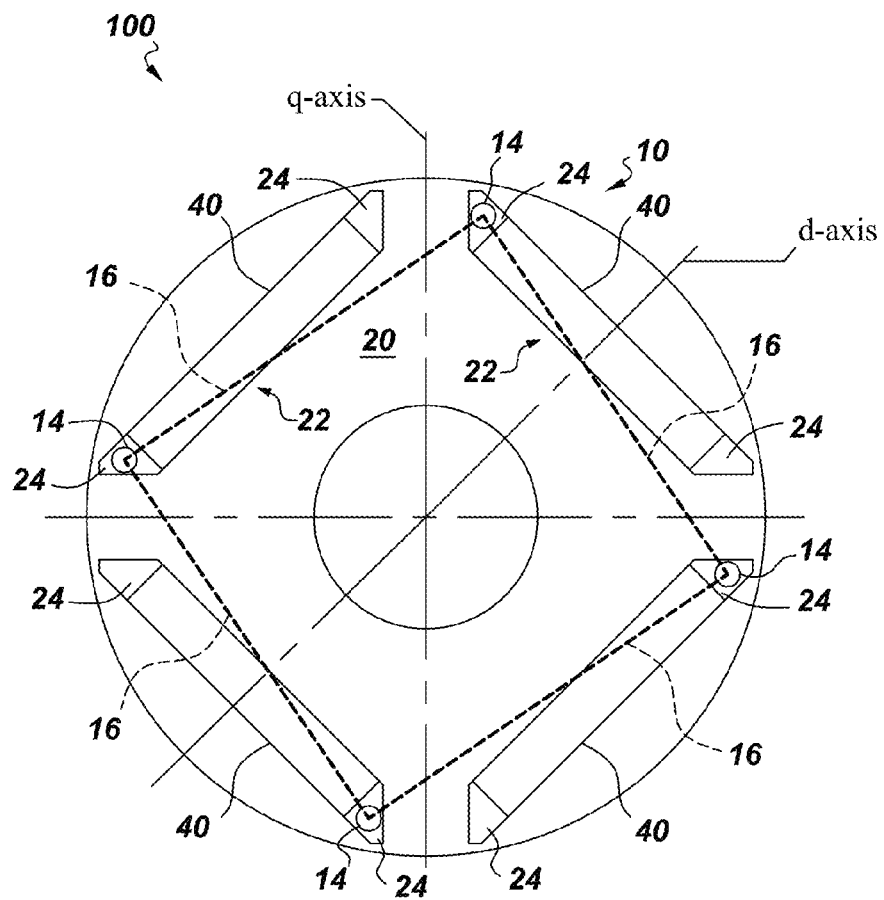
FIG. 5A is a top view of a portion of a rotor lamination and rotor circuit structure component according to another embodiment of the present invention.
Figure 5B:
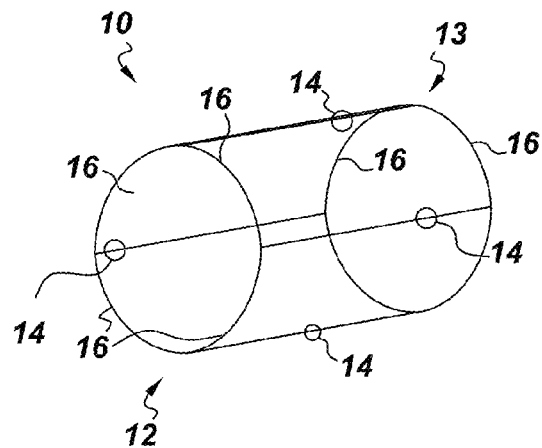
FIG. 5B is a schematic perspective diagram of the rotor circuit structure component in FIG. 5A according to an embodiment of the present invention.

Referring collectively to FIGS. 5A and 5B, a top view of a portion of a rotor lamination 20 portion of an electric machine 100 with a component 10 and a schematic diagram of a perspective view of the component 10 from FIG. 5A are shown respectively. FIG. 5A depicts a rotor lamination 20 of a single layer, four-pole IPM 100 having straight permanent magnets 40 therein. FIG. 5B depicts a rotor component 10 that may be termed a four-loop, shifted-cage configuration, similar to the embodiment shown in FIGS. 4A and 4B. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in some of the plurality of openings 24 longitudinally through the stack of rotor laminations 20. In this embodiment instead of co-locating two adjacent rotor bars 14 in a single opening 24 (as done in FIG. 4A), the two adjacent rotor bars 14 are combined into a single rotor bar 14. Again, the opening 24 at the other end of the magnet 40 is left unfilled. At or near either end of the stack of rotor laminations 20 are connection elements 16 that are connected to both ends of the rotor bars 14. In this manner, the component 10 embodiment in FIG. 5B has four rotor loops 12 each constructed of two rotor bars 14 and two connection elements 16, thereby matching the quantity of poles (i.e., four) for the particular machine 100. However, the quantity of total rotor bars 14 is less due to the effective sharing of rotor bars 14 from the adjacent loops 12 (and poles). The component 10 has eight connection elements 16 but four rotor bars 14 for use in a four pole machine 100. By cross connecting adjacent loops 12 with the connection elements 16 from adjacent poles, the four loops 12 are effectively connected to each other, thereby forming a cage, or shifted cage 13.

Figure 6A:
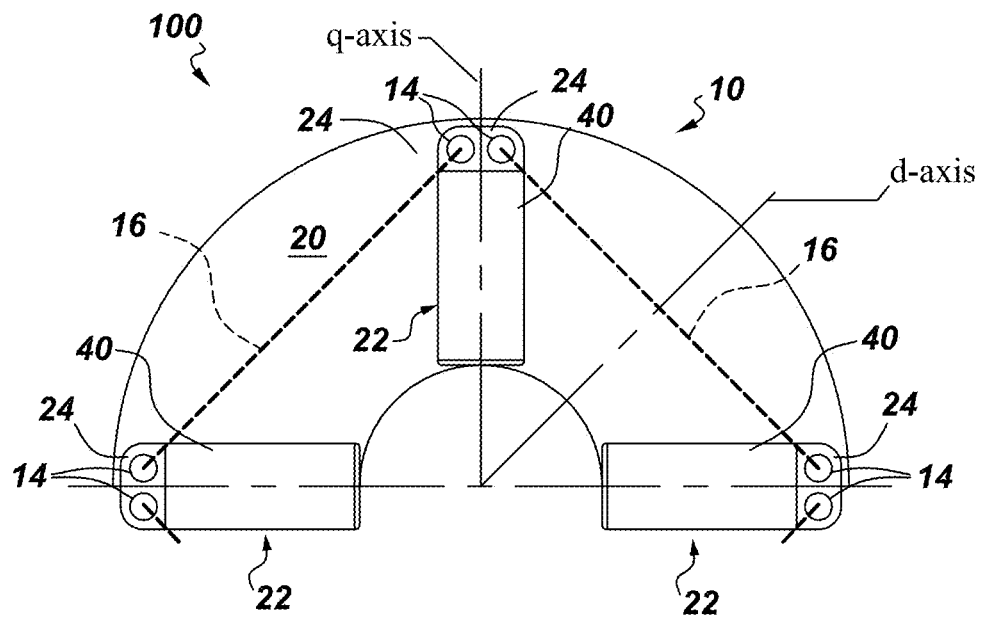
FIG. 6A is a top view of a portion of a rotor lamination and rotor circuit structure component according to another embodiment of the present invention.
Figure 6B:
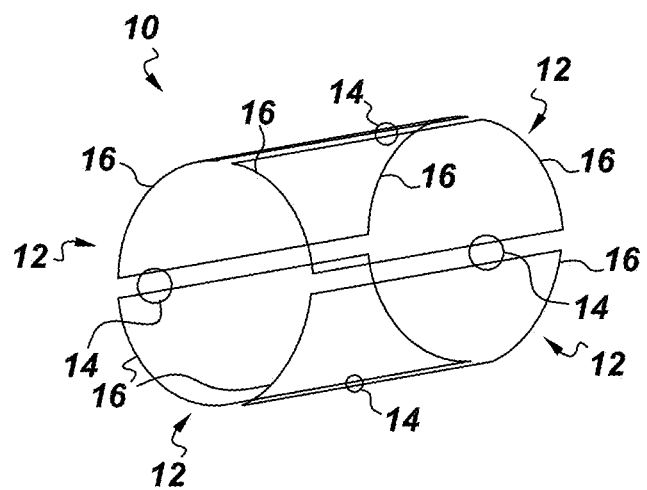
FIG. 6B is a schematic perspective diagram of the rotor circuit structure component in FIG. 6A according to an embodiment of the present invention.

Referring collectively to FIGS. 6A and 6B, a top view of a portion of a rotor lamination 20 portion of an electric machine 100 with a component 10 and a schematic diagram of a perspective view of the component 10 from FIG. 6A are shown respectively. FIG. 6A depicts a rotor lamination 20 of a spoke-type, four-pole IPM 100 having straight permanent magnets 40 therein. FIG. 6B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the plurality of outboard openings 24 longitudinally through the stack of rotor laminations 20. At or near either end of the stack of rotor laminations 20 are connection elements 16 that are connected to both ends of the rotor bars 14. In this manner, the component 10 embodiment in FIG. 6B has four rotor loops 12 each constructed of two rotor bars 14 and two connection elements 16, thereby matching the quantity of poles (i.e., four) for the particular machine 100.

Figure 7A:
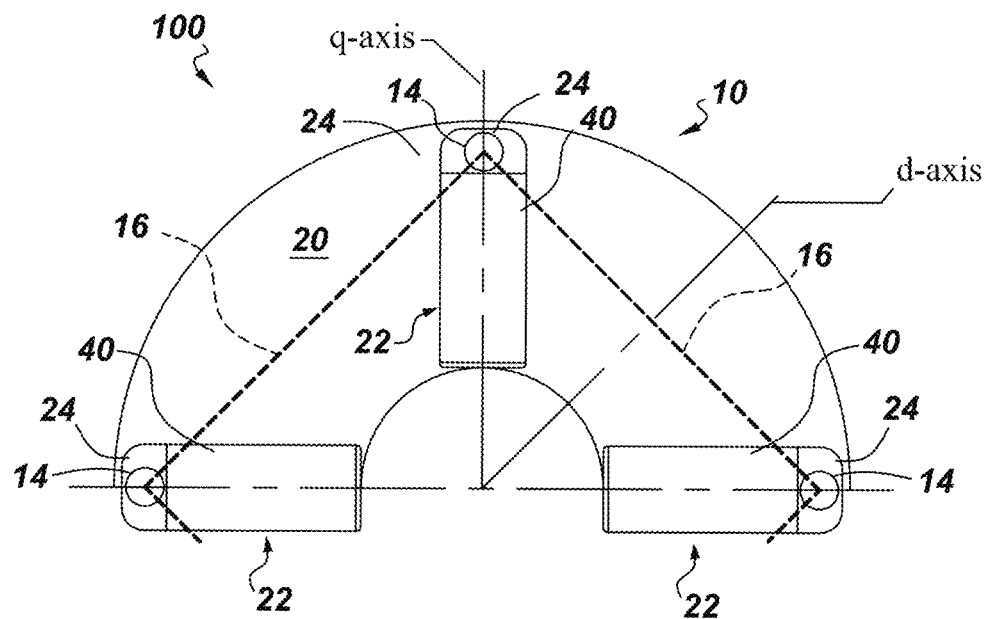
FIG. 7A is a top view of a portion of a rotor lamination and rotor circuit structure component according to another embodiment of the present invention.
Figure 7B:
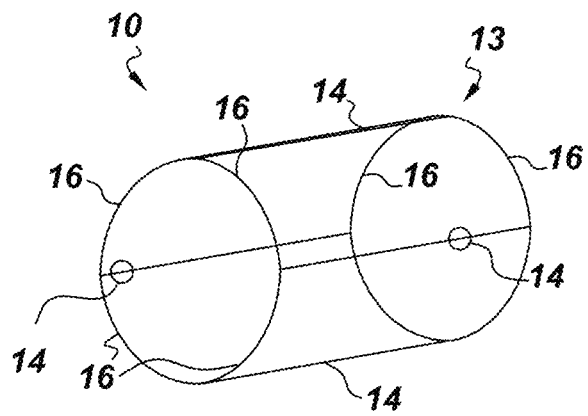
FIG. 7B is a schematic perspective diagram of the rotor circuit structure component in FIG. 7A according to an embodiment of the present invention.

Referring collectively to FIGS. 7A and 7B, a top view of a portion of a rotor lamination 20 portion of an electric machine 100 with a component 10 and a schematic diagram of a perspective view of the component 10 from FIG. 7A are shown respectively. FIG. 7A depicts a rotor lamination 20 of a spoke-type, four-pole IPM 100 having straight permanent magnets 40 therein. FIG. 7B depicts a rotor component 10 that may be termed a four-loop, rotor cage configuration, similar in aspects to the embodiment shown in FIGS. 6A and 6B. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component.

The plurality of rotor bars 14 are disposed in the outboard plurality of openings 24 longitudinally through the stack of rotor laminations 20. In this embodiment instead of co-locating two adjacent rotor bars 14 in a single opening 24 (as done in FIG. 6A), the two adjacent rotor bars 14 are combined into a single rotor bar 14. At or near either end of the stack of rotor laminations 20 are connection elements 16 that are connected to both ends of the rotor bars 14. In this manner, the component 10 embodiment in FIG. 7B has four rotor loops 12 each constructed of two rotor bars 14 and two connection elements 16, thereby matching the quantity of poles (i.e., four) for the particular machine 100. However, the quantity of total rotor bars 14 is less due to the effective sharing of rotor bars 14 from the adjacent loops 12 (and poles). The component 10 thus comprises eight connection elements 16 but four rotor bars 14 total for use in a four pole machine 100. By cross connecting adjacent loops 12 with the connection elements 16 from adjacent poles, the four loops 12 are effectively connected to each other, thereby forming a cage 13.

Figure 8A:
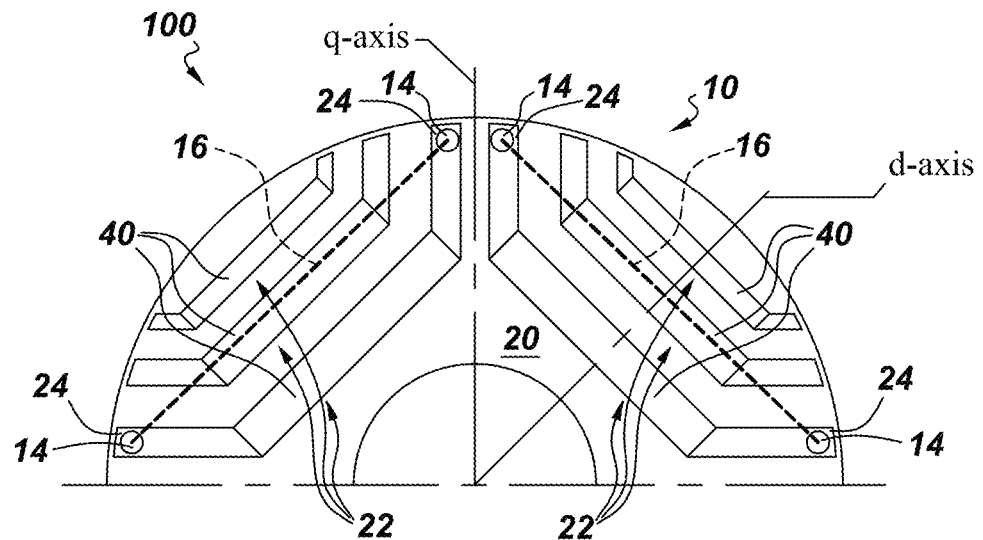
FIG. 8A is a top view of a portion of a rotor lamination and rotor circuit structure component according to another embodiment of the present invention.
Figure 8B:
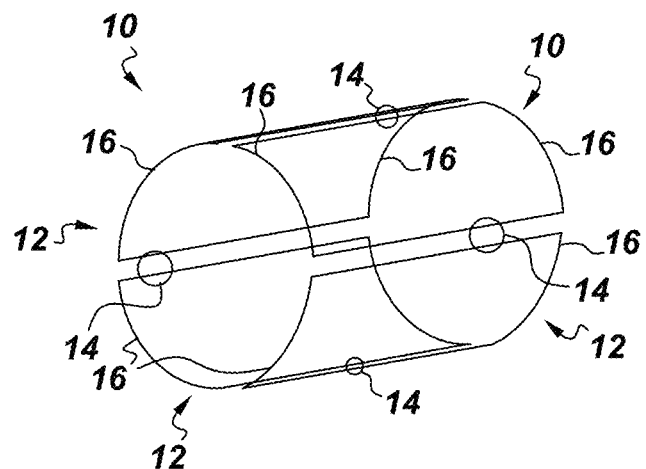
FIG. 8B is a schematic perspective diagram of the rotor circuit structure component in FIG. 8A according to an embodiment of the present invention.

Referring collectively to FIGS. 8A and 8B, a top view of a portion of a rotor lamination 20 portion of an electric machine 100 with a component 10 and a schematic diagram of a perspective view of the component 10 from FIG. 8A are shown respectively. FIG. 8A depicts a rotor lamination 20 of a multi-layer, four-pole IPM 100 having straight permanent magnets 40 therein. FIG. 8B depicts a rotor component 10 that may be termed a four-loop configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 8B has four rotor loops 12 each constructed of two rotor bars 14 and two connection elements 16, thereby matching the quantity of poles (i.e., four) for the particular machine 100. In this particular embodiment, the rotor bars 14 are located in the furthest inboard openings 24 of the multi-layer rotor lamination 20. It should be apparent, that the rotor bars could be located in other openings 24 of the lamination 20.

Figure 9A:
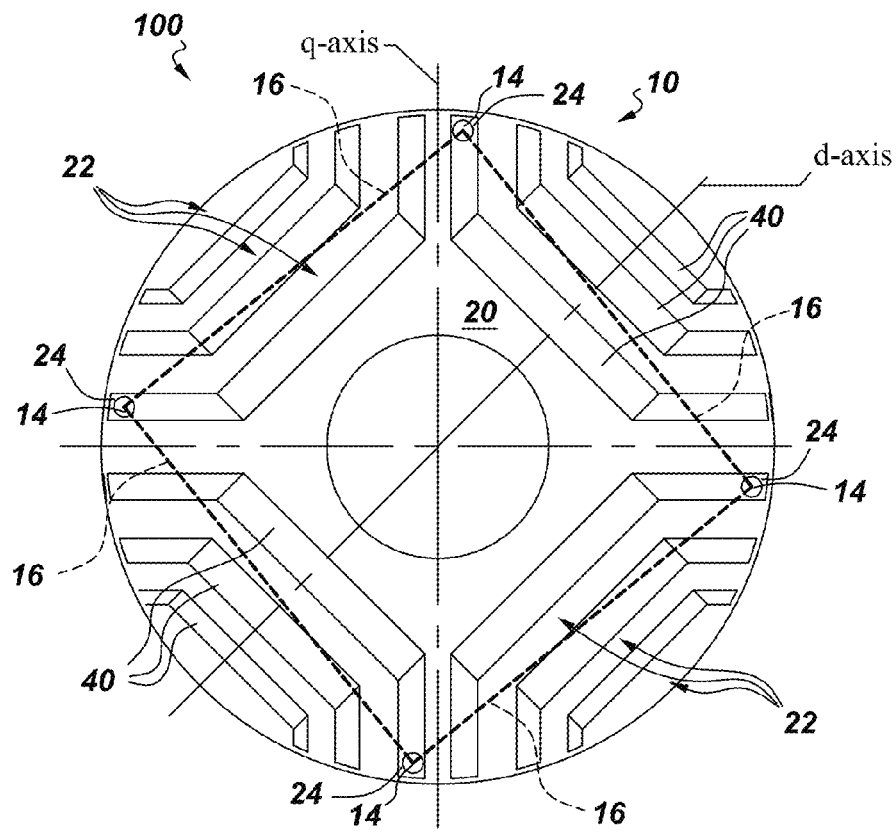
FIG. 9A is a top view of a portion of a rotor lamination and rotor circuit structure component according to another embodiment of the present invention.
Figure 9B:
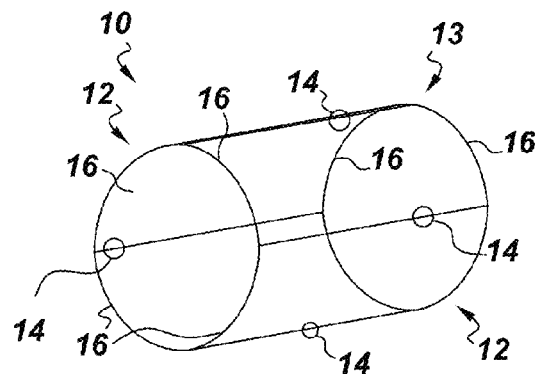
FIG. 9B is a schematic perspective diagram of the rotor circuit structure component in FIG. 9A according to an embodiment of the present invention.

Referring collectively to FIGS. 9A and 9B, a top view of (an entire) portion of a rotor lamination 20 portion of an electric machine 100 with a component 10 and a schematic diagram of a perspective view of the component 10 from FIG. 9A are shown respectively. FIG. 9A depicts a rotor lamination 20 of a multi-layer, four-pole IPM 100 having straight permanent magnets 40 therein. FIG. 9B depicts a rotor component 10 that may be termed a four-loop, cage or shifted-cage configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. In this configuration only a single rotor bar 14 is placed in an opening 24 in each pole (See FIG. 9A). At or near either end of the stack of rotor laminations 20 are connection elements 16 that are connected to both ends of the rotor bars 14. The connection element 16 connects a rotor bar 14 from a first pole to the rotor bar 14 of an adjacent pole, thereby shifting the element 10. In this manner, the component 10 embodiment in FIG. 9B has four rotor loops 12 each constructed of two rotor bars 14 and two connection elements 16, thereby matching the quantity of poles (i.e., four) for the particular machine 100. However, due to the shifted-cage configuration of the embodiment, only four rotor bars 14 total and eight connection elements 16 are required for a four-pole machine 100 such as that depicted. In this particular embodiment, the rotor bars 14 are located in the furthest inboard openings 24 of the multi-layer rotor lamination 20. It should be apparent, that the rotor bars could be located in other openings 24 of the lamination 20.

Figure 10A:
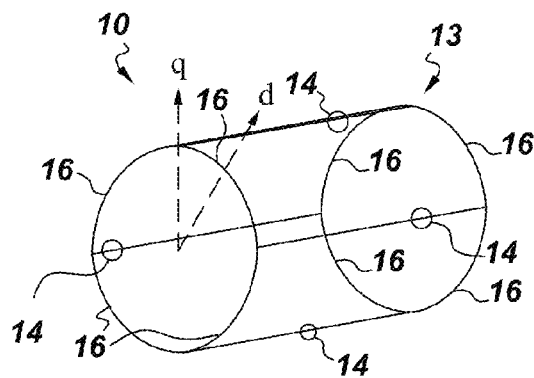
FIGS. 10A, 10B, and 10C are schematic diagrams showing perspective views of a rotor circuit structure component according to embodiments of the present invention.
Figure 10B:
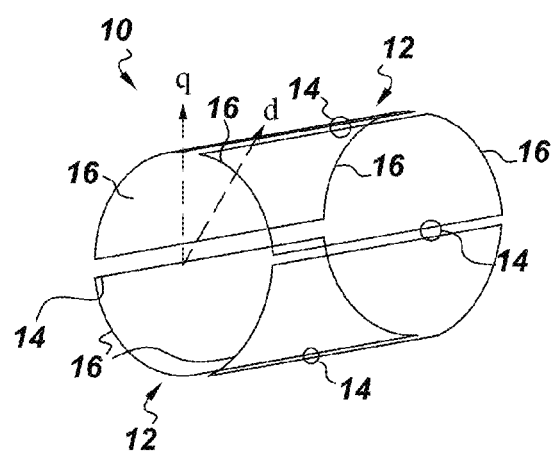
Figure 10C:
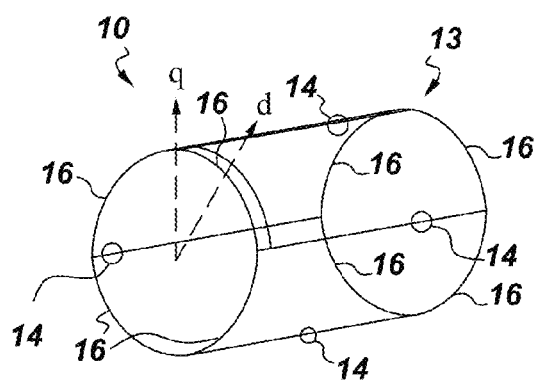

Referring collectively to FIGS. 10A, 10B, and 10C, schematic diagrams of perspective views of components 10 according to aspects of the present invention are shown. The figures are provided to show various schematic embodiments to show the general positional relationship between various elements of the component 10 and a d-axis and q-axis of a machine (not) that may employ the component 10. The d-axis (direct axis) and the q-axis (quadrature axis) are denoted by arrows labeled "d" and "q", respectively. As shown in FIG. 10A, a component 10 includes four rotor loops or rings 12. Each ring 12 comprises two rotor bars 14 connected at each end to a connector element 16. Rotor bars 14 are effectively shared by adjacent rings 12 so that all four rings 12 are connected. There are a total of four rotor bars 14 for the element 10. Because the rotor bars 14 are effectively shared by adjacent poles or the component 10, only four rotor bars 14 are needed by the component 10 for use with a four-pole machine (not shown). In this manner, the four loops 12, being interconnected, effectively define a cage 13. As shown, the approximate midpoint of the loop 12 aligns with the d-axis. In other words, a loop 12 is substantially concentric with the d-axis. Similarly, the q-axis may substantially align with a rotor bar 14.

As shown in FIG. 10B, the four rings 12 are not interconnected as in the embodiment shown in FIG. 10A. Each ring 12 comprises two rotor bars 14 and two connector elements 16. As shown, and as with the embodiment in FIG. 10A, the approximate midpoint of the loop 12 aligns with the d-axis. In other words, a loop 12 is substantially concentric with the d-axis. Similarly, the q-axis may substantially align with a conceptual line or axis between two adjacent rotor bars 14.

Referring to the embodiment shown in FIG. 10C, the element 10 comprises four rotor loops or rings 12. Each ring 12 comprises two rotor bars 14 connected at each end to a connector element 16. Rotor bars 14 are effectively shared by adjacent rings 12 so that all four rings 12 are connected, effectively defining a shifted cage 13 configuration. Thus, there are a total of four rotor bars 14 for the element 10. As shown, and as with the embodiments in FIGS. 10A and 10B, the approximate midpoint of the loop 12 aligns with the d-axis. In other words, a loop 12 is substantially concentric with the d-axis. However, in the embodiment shown in FIG. 10C, the rotor bar 14 does not align with the q-axis but is shifted by a certain angle (or distance) from the q-axis.

As shown in FIGS. 10A-10C, each embodiment is configured such that the d-axis aligns about with the midpoint of connector element 16. That is a loop 12 or plurality of inner loops may be substantially concentric with the d-axis. However, depending on the embodiment the rotor bar 14 or an equidistant axis between adjacent rotor bars 14 may align with the q-axis a shown in FIGS. 10A and 10B, respectively. Contrastingly, as shown for example in FIG. 10C, the rotor bar 14 or an equidistant axis between adjacent rotor bars 14 may be offset, or shifted, from being aligned with the q-axis. The embodiments shown are configured for use in a four-pole machine 100. It should be apparent to one skilled in the art that other configurations of elements 10 are allowed without departing from aspects of the present invention. For example, an element 10 configured for use in an eight-pole machine 100 would contrastingly have at least eight rotor bars 14. In embodiments of the present invention, the quantity of rotor bars 14 would equal the quantity of poles of the machine 100 (see e.g., FIGS. 10A and 10C). Contrastingly, in other embodiments, such as the element 10 shown in FIG. 10B, the quantity of rotor bars 14 (e.g., eight) may be double the quantity of poles (e.g., four) of the machine 100. Clearly, other configurations of elements 10 that have differing quantities of rotor bars 14 in view of quantity of poles of the machine 100 in which the element 10 is configured for are available under aspects of the present invention without departing from the intent of the invention.

Figure 11:
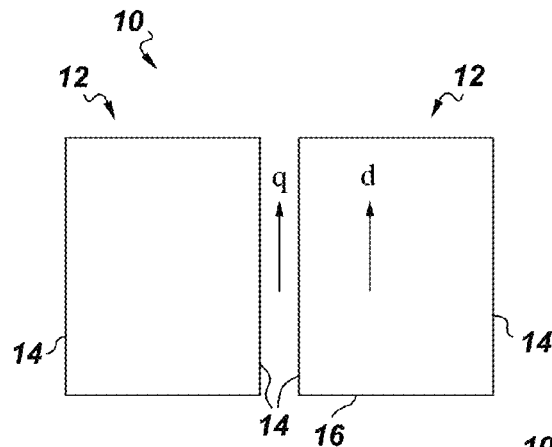
FIG. 11 is a schematic diagram of a top view of a portion of a rotor circuit structure component according to an embodiment of the present invention.
Figure 12A:
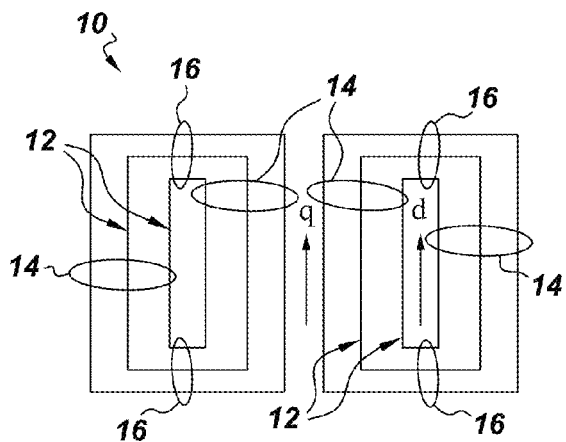
FIG. 12A is a schematic diagram of a top view of a portion of a rotor circuit structure component according to an embodiment of the present invention.

Referring to FIGS. 11 and 12A, schematic diagrams of top views of a portion of a rotor structure component 10 according to embodiments of the present invention are shown. (These schematic views are such that effectively it is as if the component 10 were opened and rolled out flat, in a planar fashion, on the plane of the page). The component 10 comprises a plurality of rotor bars 14 connected to a plurality of connection elements 16. The component 10 in FIG. 11 comprises a single ring 12 per pole of the machine 100 (not shown). The two adjacent rotor bars 14 align with the q-axis and the approximate midpoint of the ring 12 aligns with the d-axis. That is the ring 12 on the right side in the FIG. 11 is substantially concentric with the d-axis. Alternatively, the component 10 of FIG. 12A comprise multiple rings 12 per pole of the machine 100 (not shown). Multiple rings 12 can further assist in further increasing saliency. There are three rings 12 per pole on the component 10 shown. The outermost two adjacent rotor bars 14 of the rings 12 align with the q-axis and the approximate midpoints of the multiple rings 12 align with the d-axis. That is the rings 12 on the right side in the FIG. 12A are substantially concentric with the d-axis. It should be apparent that although three rings 12 are depicted, other configurations and quantities are allowable without departing from aspects of the present invention.

Figure 12B:
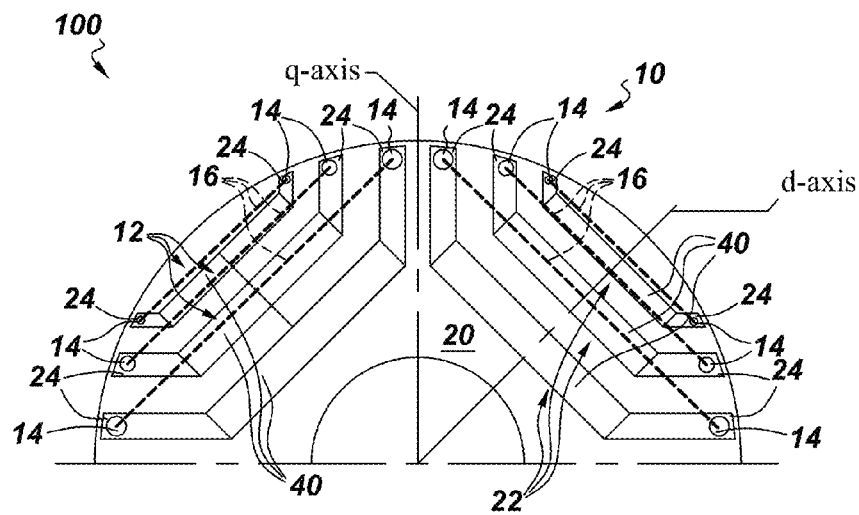
FIG. 12B is top view of a portion of a rotor lamination and the rotor circuit structure component of FIG. 12A according to another embodiment of the present invention.

Referring to FIG. 12B, a top view of a portion of a rotor lamination 20 portion of an electric machine 100 with a component 10 and a schematic diagram of a perspective view of the component 10 from FIG. 12A is shown. FIG. 12B depicts a rotor lamination 20 of a multi-layer, four-pole IPM 100 having straight permanent magnets 40 therein. Some attributes of the embodiment shown are similar to the embodiment shown in FIG. 8A. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this manner, the component 10 embodiment in FIG. 12B has four rotor loops 12 each constructed of two rotor bars 14 and two connection elements 16, thereby matching the quantity of poles (i.e., four) for the particular machine 100. However, there are two inner rings or loops 12 for each ring or loop 12 (See FIG. 12A). As shown, the rotor bars 14 for each of the two inner rings or loops 12 also are inserted into the openings 24 adjacent to magnets 40.

Figure 13:
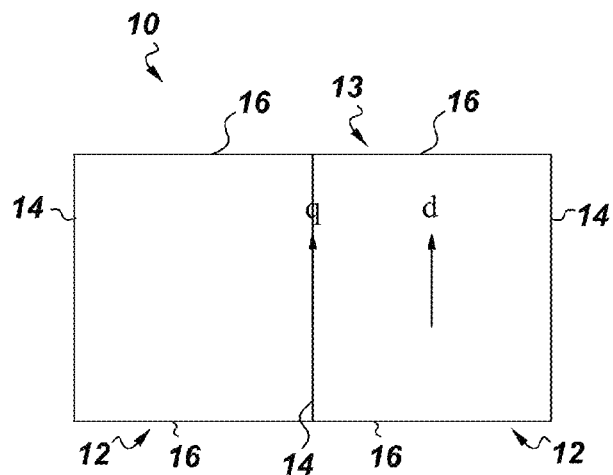
FIG. 13 is a schematic diagram of a top view of a portion of a rotor circuit structure component according to an embodiment of the present invention.
Figure 14A:
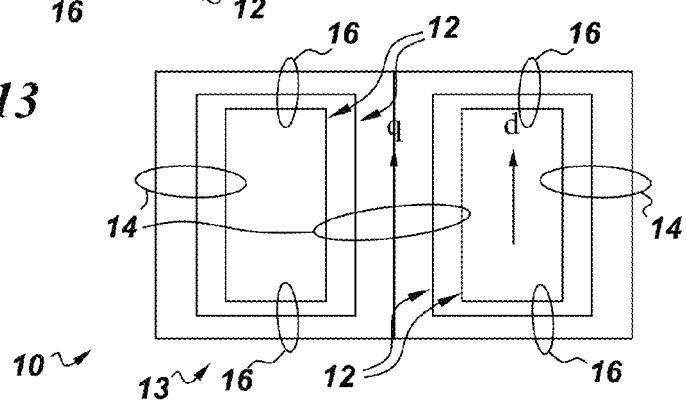
FIG. 14A is a schematic diagram of a top view of a portion of a rotor circuit structure component according to an embodiment of the present invention.

Referring to FIGS. 13 and 14A, schematic diagrams of top views of a portion of a rotor structure component 10 according to embodiments of the present invention are shown. (These schematic views are such that effectively it is as if the component 10 were opened and rolled out flat, in a planar fashion, on the plane of the page). The component 10 comprises a plurality of rotor bars 14 connected to a plurality of connection elements 16. The rotor bars 14 are shared by adjacent loops or rings 12. As such the rings 12 collectively form a cage 13. The component 10 in FIG. 13 comprises a cage 13 with a single loop 12 per pole of the machine 100

(not shown). The single, shared rotor bar 14 aligns with the q-axis and the approximate midpoint of the loops 12 of the cage 13 aligns with the d-axis. That is the ring 12 of the cage 13 on the right side in the FIG. 13 is substantially concentric with the d-axis. Alternatively, the component 10 of FIG. 14A comprise a cage 13 also having multiple inner rings 12 per pole of the machine 100 (not shown). The additional multiple rings 12 can further assist in further increasing saliency. There are two inner rings 12 per pole on the component 10 in addition to the cage 13. The shared rotor bar 14 of the cage 13 aligns with the q-axis and the approximate midpoints of the multiple inner rings 12 and the cage 13 align with the d-axis. That is the rings 12 and the cage 13 on the right side in the FIG. 14A is substantially concentric with the d-axis. It should be apparent that although two rings 12 are depicted in addition to the cage 13, other configurations and quantities are allowable without departing from aspects of the present invention.

Figure 14B:
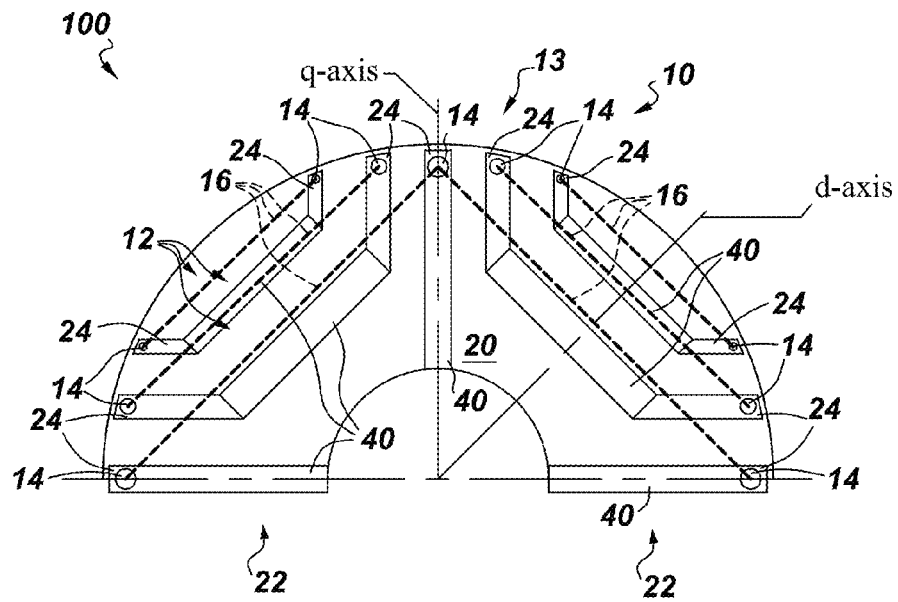
FIG. 14B is top view of a portion of a rotor lamination and the rotor circuit structure component of FIG. 14A according to another embodiment of the present invention.

Referring to FIG. 14B, a top view of a portion of a rotor lamination 20 portion of an electric machine 100 with a component 10 and a schematic diagram of a perspective view of the component 10 from FIG. 14A is shown. FIG. 14B depicts a rotor lamination 20 of a combination multi-layer/spoke-type, four-pole IPM 100 having straight permanent magnets 40 therein. Some attributes of the embodiment shown are similar to the embodiments shown in both FIG. 7A and FIG. 8A. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole. As shown, the spoke-type aspect of the IPM 100 also includes magnets 40 that are radially disposed in a plurality of openings 22. Once the permanent magnets 40 are disposed within the openings 22 there typically remains adjacent to either end of the permanent magnets 40 an opening 24.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. As shown in FIG. 14A, the outer rings 12 share common rotor bars 14, thereby defining a cage 13. In this manner, the component 10 embodiment in FIG. 14B has four rotor loops 12 each constructed of two rotor bars 14 and two connection elements 16, thereby matching the quantity of poles (i.e., four) for the particular machine 100. The four rotor loops 12 sharing common rotor bars 14 thereby defines a cage 13. Thus, the cage 13 may be formed of four rotor bars 14 and eight total connector elements 16. However, there are also two inner rings or loops 12 for each outer ring or loop 12 (See FIG. 14A). As shown, the rotor bars 14 for each of the two inner rings or loops 12 also are inserted into the openings 24 adjacent to magnets 40. The rotor bars 14 for the cage 13 may be inserted in the openings 24 adjacent to the spoke-type magnets 40. The rotor bars 14 for the two inner loops or rings 12 may be inserted in the openings 24 adjacent to the multi-layer type magnets 40.

Figure 15:
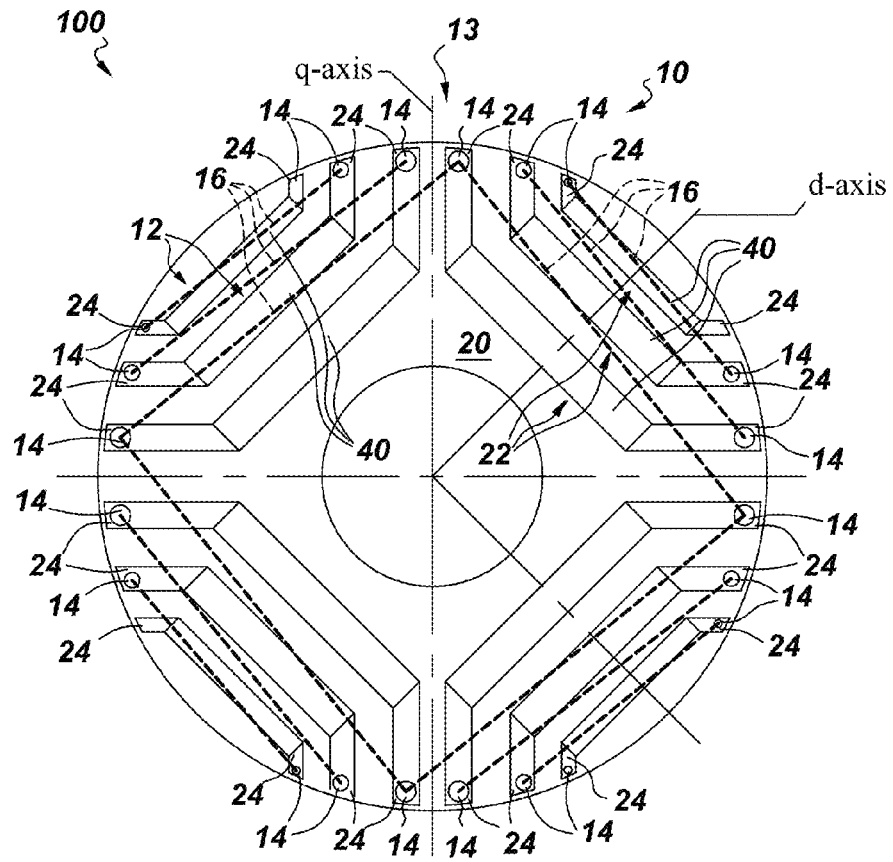
FIG. 15 is top view of a portion of a rotor lamination and the rotor circuit structure component according to another embodiment of the present invention.

Referring to FIG. 15, a top view of (an entire) portion of a rotor lamination 20 portion of an electric machine 100 with a component 10 is shown. FIG. 15 depicts a rotor lamination 20 of a multi-layer, four-pole IPM 100 having straight permanent magnets 40 therein. This embodiment is similar in some aspects to the embodiments illustrated in FIGS. 9A and 9B and the FIGS. 14A and 14B. The rotor component 10 may be termed a shifted-cage with inner rings or loops configuration. As shown and known in the art, the rotor lamination 20 includes a plurality of openings 22 that, depending on the particular embodiment, may have disposed therein one or more permanent magnets 40. Once the permanent magnets 40 are disposed within the openings 22 there typically remains adjacent to either end of the permanent magnets 40 an opening, or remaining opening, 24. For illustrative purposes only, the stator and/or stator windings are not shown that substantially surround the rotor component. As with multi-layer IPM, there is typically a plurality of rows of openings 22 and permanent magnets 40 therein located for each pole.

The plurality of rotor bars 14 are disposed in the plurality of openings 24 longitudinally through the stack of rotor laminations 20. In this configuration only a single rotor bar 14 is placed in an opening 24 in each pole (See FIG. 9A). At or near either end of the stack of rotor laminations 20 are connection elements 16 that are connected to both ends of the rotor bars 14. The connection element 16 connects a rotor bar 14 from a first pole to the rotor bar 14 of an adjacent pole, thereby shifting the element 10 creating a shifted cage 13 configuration. In this manner, the component 10 embodiment has four rotor loops 12 each constructed of two rotor bars 14 and two connection elements 16, thereby matching the quantity of poles (i.e., four) for the particular machine 100. However, due to the shifted-cage configuration of the embodiment, only four rotor bars 14 total and eight connection elements 16 are required for a four-pole machine 100 such as that depicted. In this particular embodiment, the rotor bars 14 are located in the furthest inboard openings 24 of the multi-layer rotor lamination 20. It should be apparent, that the rotor bars could be located in other openings 24 of the lamination 20. In addition, there are two additional inner loops 12 for each pole that are shifted in their configuration as well.

Figure 16:
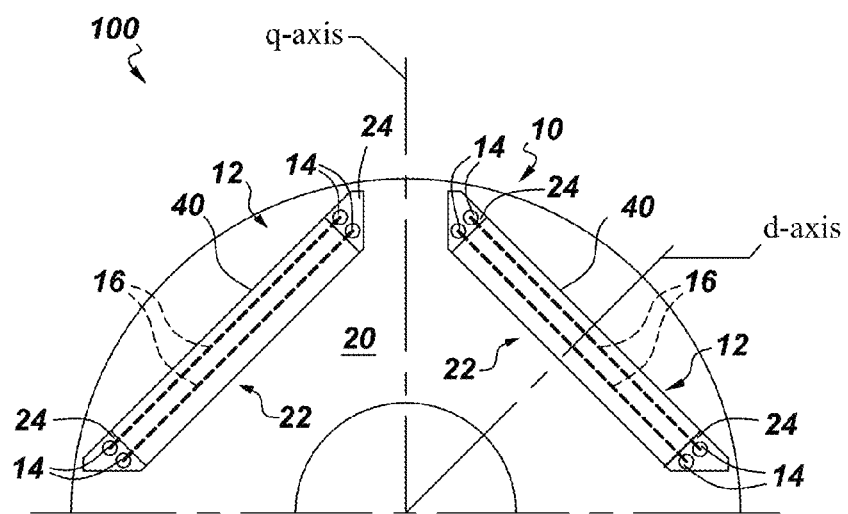
FIG. 16 is top view of a portion of a rotor lamination and the rotor circuit structure component according to another embodiment of the present invention.

Referring to FIG. 16, a top view of a portion of a rotor lamination 20 portion of an electric machine 100 with a component 10 is shown. FIG. 16 depicts a rotor lamination 20 of a single layer, four-pole IPM 100 having straight permanent magnets 40 therein. (The embodiment is similar in aspects to the embodiment shown in FIGS. 3A and 3B). As shown and known in the art, the rotor lamination 20 includes a plurality of stator windings (not shown) and inboard of the stator windings are disposed one or more permanent magnets 40 located in one or more openings 22 in the rotor lamination 20. Once the permanent magnets 40 are disposed within the openings 22 there typically remains adjacent to either end of the permanent magnets 40 an opening 24.

The plurality of rotor bars 14 are disposed in the plurality of openings 24 longitudinally through the stack of rotor laminations 20. At or near either end of the stack of rotor laminations 20 are connection elements 16 that are connected to both ends of the rotor bars 14. In this embodiment, one or more ring 12 (i.e., rotor bars 14 and connection elements 16) is split into two or more rings 12. As shown, there are two rotor bars 14 placed in the openings 24, and there are two connection elements 16 connecting the two rotor bars 14. In this manner, the component 10 embodiment in FIG. 16 has four rotor loops 12 where each loop 12 is constructed of four rotor bars 14 and four connection elements 16 for the particular machine 100. By splitting the loops into multiple loops (term "split rotor bar" configuration) fault tolerance is provided. As long as at least one loop in the plurality of loops remains functional, the ring 12 will be able to introduce the desired ring saliency. It should be apparent that under aspects of the present invention that various configurations of splitting, via design, a connection element 16, rotor bar 14, loop 12, and/or cage 13 into two or more elements other than that shown is possible. For example, the elements may be in other quantities than just two (as depicted in FIG. 16.

Figures 17A, 18:
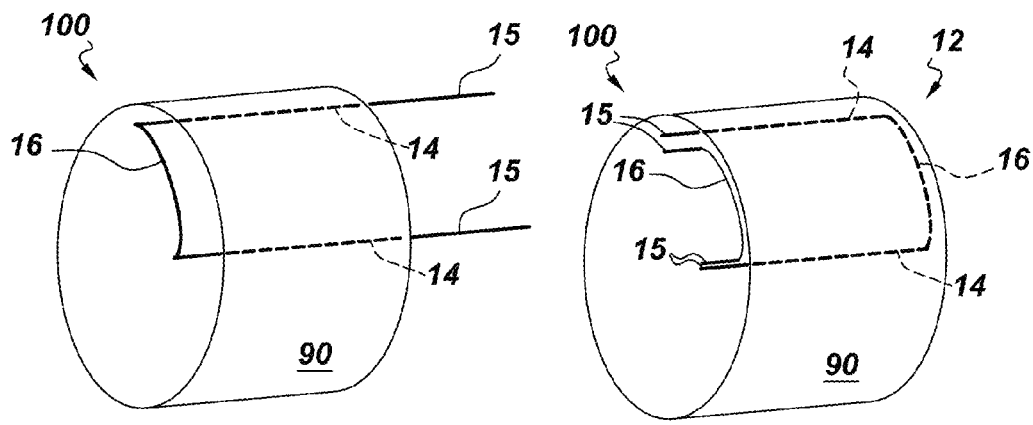
FIG. 17A is schematic diagram showing a perspective view of a partial installation of a portion of a rotor circuit structure component in a rotor portion of a machine according to an embodiment of the present invention.
FIG. 18 is schematic diagram showing a perspective view of a completed installation of a portion of a rotor circuit structure component in a rotor portion of a machine according to another embodiment of the present invention.
Figures 17B, 19:
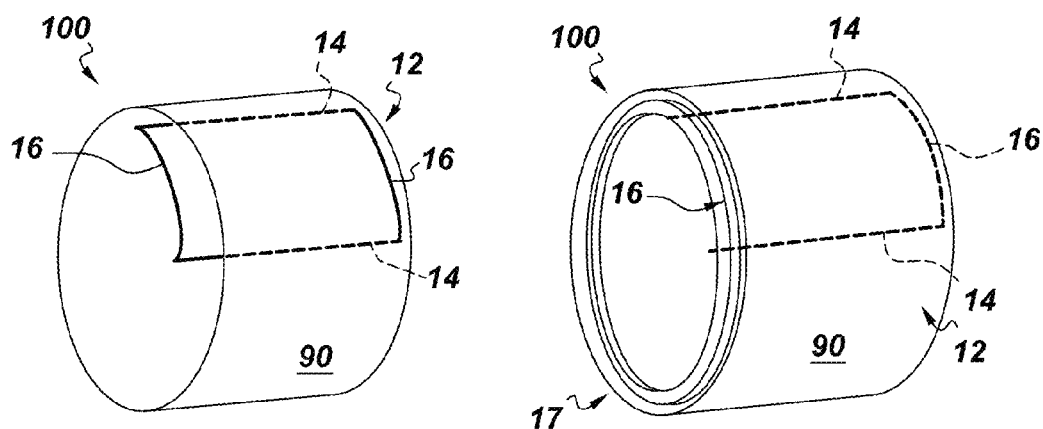
FIG. 17B is schematic diagram showing a perspective view of a completed installation embodiment shown in FIG. 17A.
FIG. 19 is schematic diagram showing a perspective view of a completed installation of a portion of a rotor circuit structure component in a rotor portion of a machine according to another embodiment of the present invention.

Referring collectively to FIGS. 17A, 17B, 17, and 18, schematic diagrams of perspective views of various embodiments showing the installation of a portion of a component 10 in a machine 100 in accordance with aspects of the present invention. While FIG. 17A shows a partial installation of an element, while FIG. 17B shows the completed installation of the element from FIG. 17A. A U-shaped element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100 (not fully shown). As shown, each of the rotor bars 14 has extensions 15 that extend beyond the length of the rotor core 90 of the machine 100. The extensions 15 may then be bent and connected together to form a second connection element 16, thereby forming a completed ring 12, as shown in FIG. 17B. The extensions 15 may be connected by any known method including, but not limited to, brazing, welding, mechanically fastening, and the like.

Referring to the embodiment shown in FIG. 18, a U-shaped element (similar to the embodiment discussed in FIG. 17A) comprising element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100 (not entirely shown). As shown, each of the rotor bars 14 has extensions 15 that extend beyond the length of the rotor 90 of the machine 100. In a typical embodiment, the extensions 15 of the embodiment in FIG. 18 do not need to be as long as the extensions 15 of the embodiment in FIG. 17A. A small U-shaped end piece 18, made of a conductive material, having extensions 15 may be placed so that the respective extensions 15 of the end piece 18 and the U-shaped element are adjacent to each other. The extensions 15 may be connected by suitable means (e.g., brazing, welding, mechanical fastening, etc.) thereby creating a loop 12. It should be noted that the end piece need not be U-shaped as discussed above. For example, in another embodiment, a straight element like connection element 16 without extensions 15 may be used in lieu of the U-shaped end piece 18, wherein the connection element 16 is attached to the U-shaped element and connected thereto.

Referring to the embodiment shown in FIG. 19, a U-shaped element (similar to the embodiment discussed in FIG. 18) comprising element, which may be pre-formed (e.g., bent), is made of a conductive, non-magnetic material comprising two rotor bars 12 connected via a connection element 16. The U-shaped element may be inserted into two openings (e.g., 24) in the rotor 90 of the machine 100. As shown, each of the rotor bars 14 has extensions 15 that extend beyond the length of the rotor 90 of the machine 100. In a typical embodiment, the extensions 15 of the embodiment in FIG. 19 do not need to be as long as the extensions 15 of the embodiment in FIG. 17A. A full-ring connector 17, made of conductive material, may be placed so that the extensions 15 of the U-shaped element are adjacent to and/or extending through the connector 17. The extensions 15 and/or rotor bars 14 may be connected to the connector 17 by suitable means (e.g., brazing, welding, mechanical fastening, etc.) thereby creating a loop 12.

Figure 20:
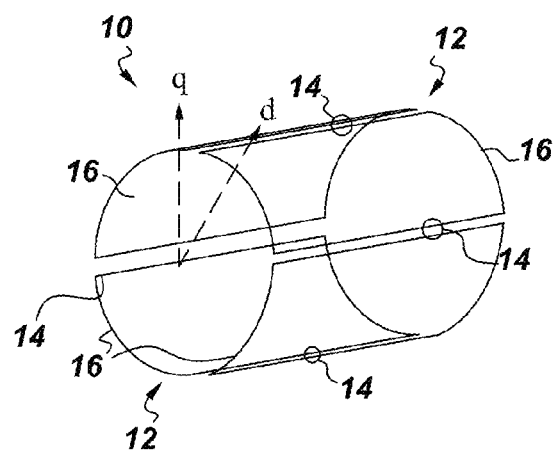
FIG. 20 is a schematic diagram showing a perspective view of a rotor circuit structure component according to another embodiment of the present invention.

Referring to FIG. 20, a schematic diagram of a perspective view of a component 10 according to an aspect of the present invention is shown. The d-axis (direct axis) and the q-axis (quadrature axis) are denoted by arrows labeled "d" and "q", respectively. As shown, the component 10 includes four rotor loops or rings 12. Each ring 12 comprises two rotor bars 14 connected at one end to a connector element 16. The other ends of the rotor bars 14 are connected to a single full ring connector 17. In this manner, all rings 12 are effectively connected to the full ring connector 17, thereby defining a cage 13. There are a total of eight rotor bars 14 for the element 10. In this manner, the four loops 12, being interconnected, effectively define a cage 13. As shown, the approximate midpoint of a loop 12 aligns with the d-axis. In other words, a loop 12 is substantially concentric with the d-axis. Similarly, the q-axis substantially aligns with a midpoint between two adjacent rotor bars 14.

While various embodiments discussed herein have general disclosed magnets 40 and openings 22 of specific sizes and configurations, it should be apparent that different quantities, shapes, and configurations that those illustrated may be used without departing from aspects of the present invention. For example, the openings 22 and/or magnets 40 may be other shapes other than straight including, for example, curved, trapezoidal, round, and the like, and combinations thereof.

While various embodiments discussed herein have general disclosed rotor conductors (e.g., rotor bars 14) disposed in openings 24 adjacent to magnets 40 in the rotor lamination 20, it should be apparent that under aspects of the present invention that the rotor conductors, in certain embodiments, are disposed in openings and/or voids (e.g., grooves, channels, gaps, etc.) on the outer portion 90 of the rotor. In other words, in embodiments the rotor conductors may be placed in a location such that, at least initially, is not fully surrounded by rotor lamination material.

Finite-element analysis based modeling was conducting on various models of machines, both for electric machines not having any rotor circuit structure (i.e., related art) and for electric machines using embodiments of the rotor circuit structures of the present invention. Some results of the modeling are illustrated in FIGS. 21-24 herein.

Small signal saliency and small signal saliency angle is key information used for sensorless control, under aspects of the present invention, and it is defined using small signal impedance. Small signal impedance is defined for a small high frequency variation of current ($\Delta i_d$, $\Delta i_q$) from the operating point current vector ($i_d$, $i_q$). Small signal impedance varies depending on the orientation of the high frequency current variation ($\Delta i_d$, $\Delta i_q$). Small signal saliency at a given operating point ($\Delta i_d$, $\Delta i_q$) is the ratio of the maximum small signal impedance to the minimum small signal impedance over a full range of orientation of the high frequency current variation. Small signal saliency is greater than or equal to 1, and it is desired to be much larger than 1 for suitable sensorless control performance. Small signal saliency angle is the angular displacement of the maximum small signal impedance orientation from the rotor reference frame, for example the q-axis of the rotor reference frame. The small signal saliency angle is desired to be constant over the operating range, near zero for example, in order to achieve desired encoderless control performance.

Figure 21:
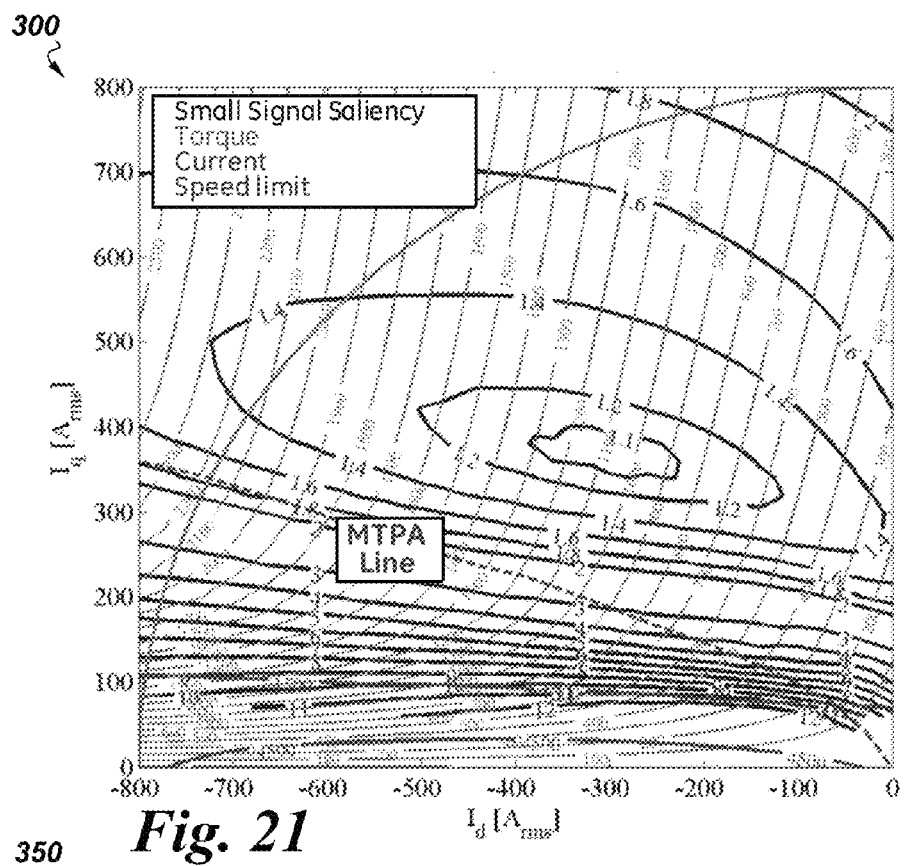
FIG. 21 is a graph illustrating small signal saliency for electric machine of the related art.
Figure 22:
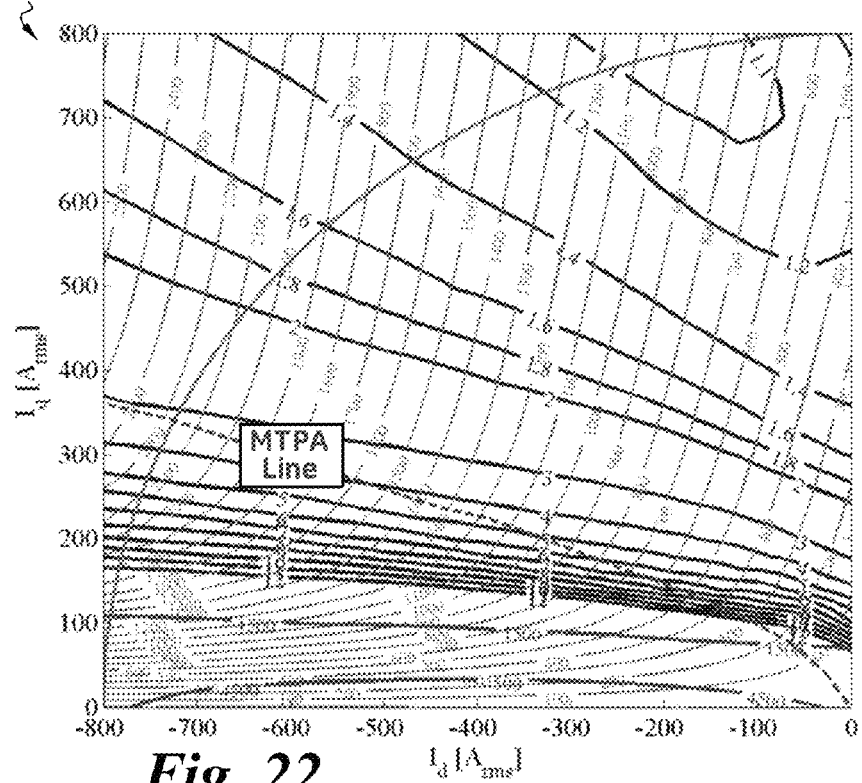
FIG. 22 is a graph illustrating small signal saliency for an electric machine with a rotor circuit structure, according to an embodiment of the present invention.

Referring to FIG. 21, a graph showing the small signal saliency on the current vector ($i_d$, $i_q$) plane for an IPM machine of the related art is depicted as element 300. Contrastingly, FIG. 22 shows the contour plots of small signal saliency of an IPM machine incorporating the component in accordance with the present invention as element 350. As shown in the graph, the resultant saliency is improved and increased as compared to the saliency in the related art machine (FIG. 21).

Figure 23:
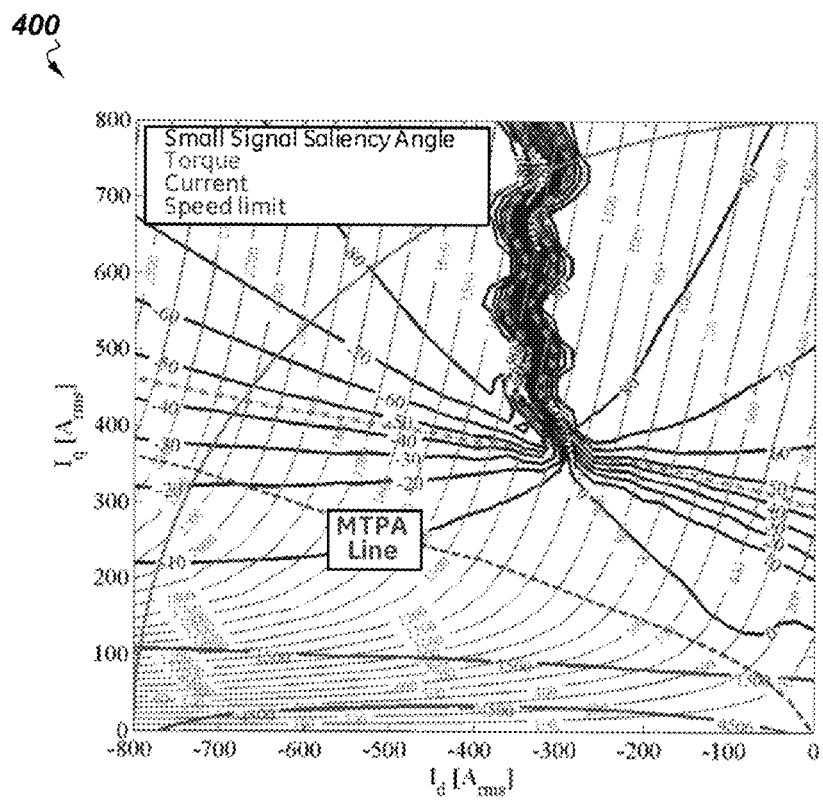
FIG. 23 is a graph illustrating small signal saliency angle for electric machine of the related art.
Figure 24:
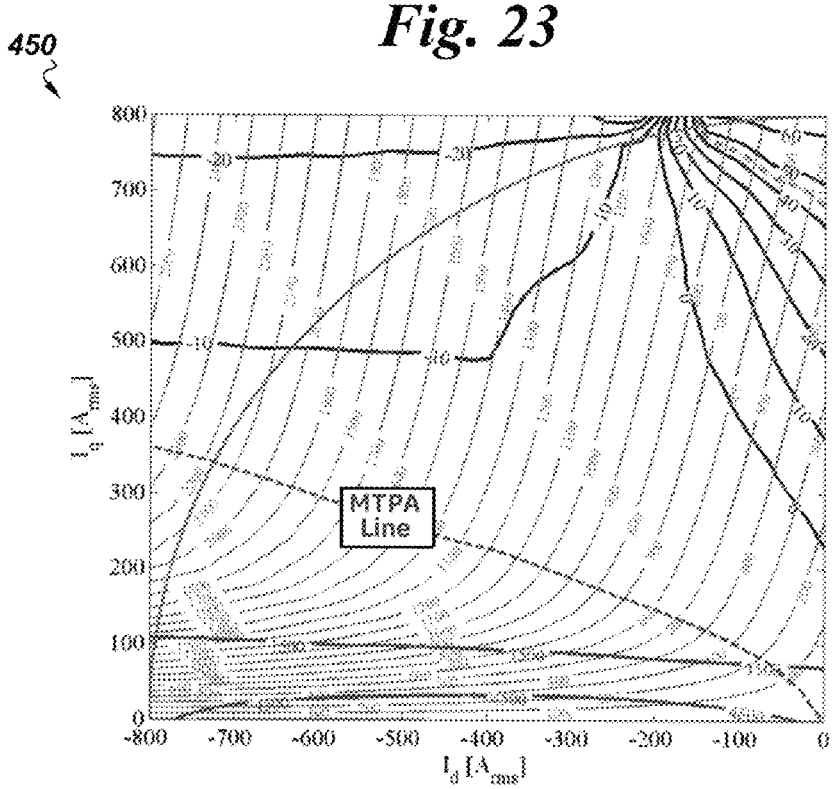
FIG. 24 is a graph illustrating small signal saliency angle for an electric machine with a rotor circuit structure, according to an embodiment of the present t

Referring to FIG. 23, a graph showing the contour plots of small signal saliency angle on the current vector ($i_d$, $i_q$) plane an IPM machine of the related art is depicted as element 400. Contrastingly, FIG. 24 shows the contour plots of small signal saliency angle of an IPM machine incorporating the component in accordance with the present invention as element 450. As shown in the graph, the resultant wide angular margin by using the component as compared to the related art machine (FIG. 23) depicting the very tight saliency angle.

Referring to FIG. 23, a graph showing the contour plots of small signal saliency angle on the current vector (id, iq) plane an IPM machine of the related art is depicted as element 400. Contrastingly, FIG. 24 shows the contour plots of small signal saliency angle of an IPM machine incorporating the component in accordance with the present invention as element 450. As shown in the graph, the resultant wide angular margin by using the component as compared to the related art machine (FIG. 23) depicting the very tight saliency angle.

Figure 25:
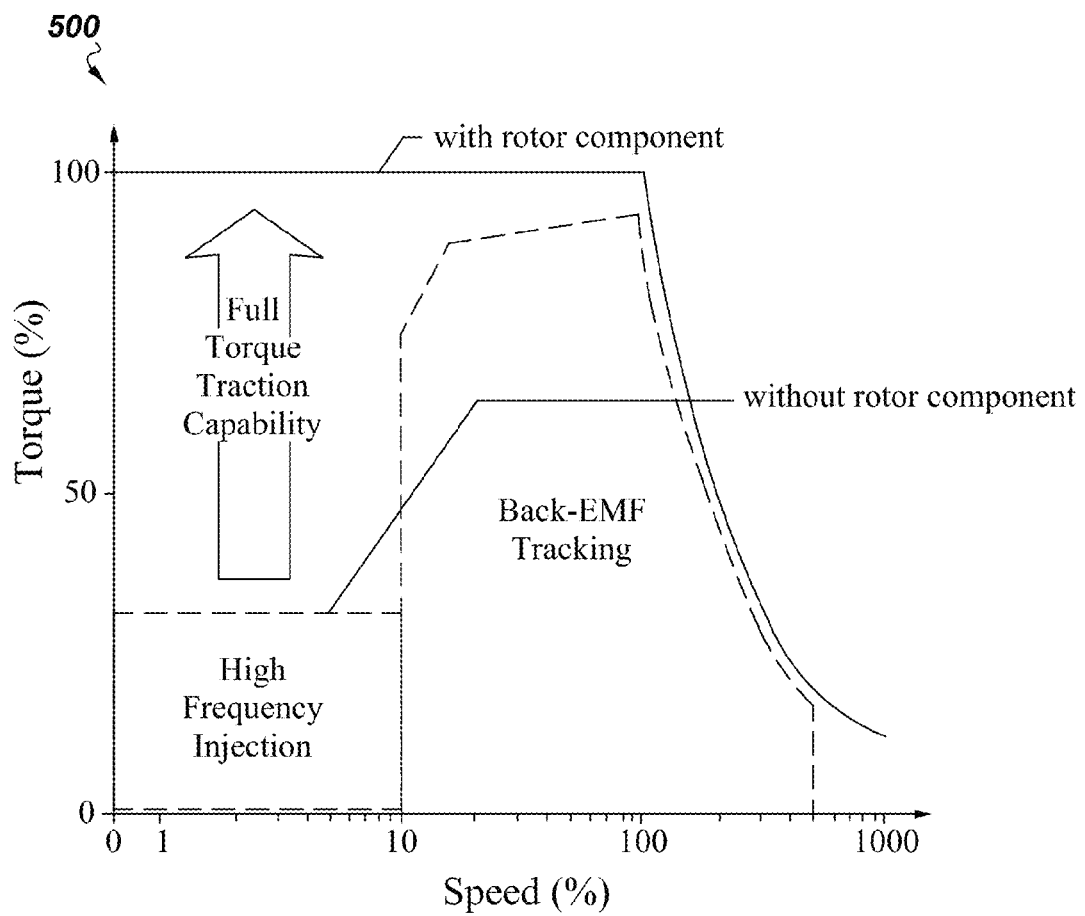
FIG. 25 is a schematic graph comparing motor speed and torque for a related art machine (without a rotor structure) and a machine with a rotor circuit structure, according to an embodiment of the present invention.

FIG. 25 shows a graph that depicts speed (%) on a x-axis vs. torque (%) on a y-axis. As shown, when a machine uses the component of the present invention the performance of the machine may reach the upper-left portion (i.e., dark upward pointing arrow) of the graph. That is by employing aspects of the present invention, full torque capability at lower machine speeds is attainable. (For example, an electric machine of the present invention may reach 50% of torque capability at speeds below 10% of the rated speed of the machine. In other embodiments, the electric machine may reach over 75% of torque capability at speeds below 10% of the rated speed of the machine. In still other embodiments, the electric machine may reach over 90% of torque capability at speeds below 10% of the rated speed of the machine. In still other embodiments, the electric machine may reach 100% of torque capability at speeds below 10% of the rated speed of the machine.)

Under aspects of the present invention, the components 10 and the electric machines 100 discussed herein may be used as a traction motor for virtually any vehicle. A vehicle support frame connected to the one or more electric machine 100. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

While the embodiments illustrated and described generally herein have shown that the electric machine 100 to be an interior permanent magnet (IPM) machine, other electric machines than those illustrated herein may employ aspects of the present invention including, for example, PMSRM, SRM, and induction machine, and the like. Various embodiments of the rotor circuit component 10 may be used in these various other types of electric machines.

Aspects of the present invention provide a motor design methodology that offers several advantages including both an easier manufacturing process that leads to lower production costs, coupled with a reduction in torque ripple. This design, in turn, translates into less stringent requirement in the design of a gearbox connected between the electric motor employing this design with the wheel. Ultimately, this improvement may further lead to cost savings and/or small dimensions with the gearbox.

Torque ripple for purposes herein can be estimated by the following equation:

$$T_{ripple} = (T_{max} - T_{min})/T_{avg}$$

Figure 26:
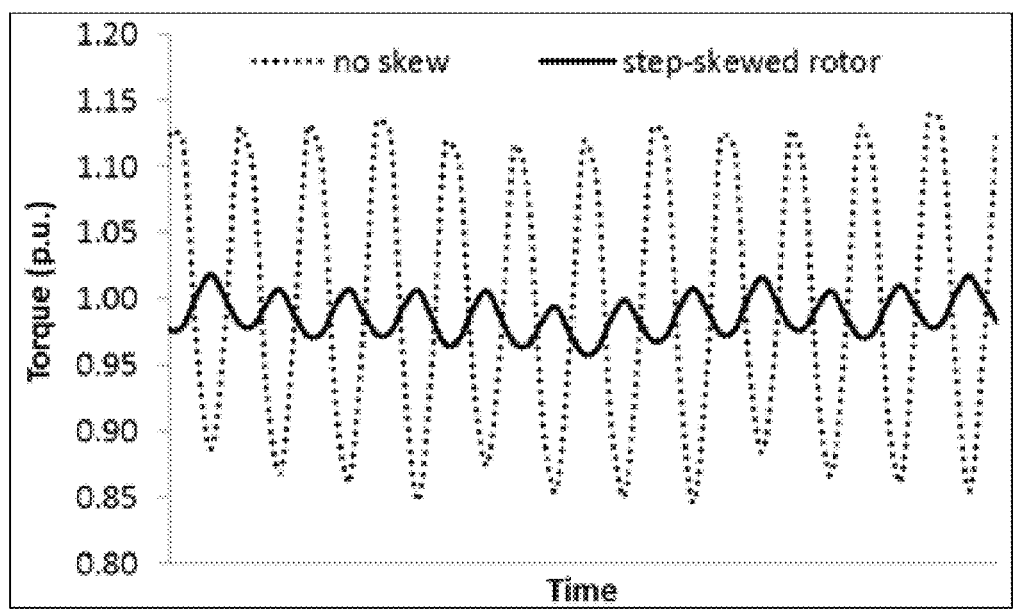
FIG. 26 is a graph illustrating torque over time and the effects in reducing torque ripple in applying aspects of the present invention.

Aspects of the present invention solves both a manufacturing and electro-mechanical problem with IPM machines in that certain embodiments allow for the use of multiple short rotor sections which facilitates the insertion of permanent magnets into the rotor structure, thereby reducing the risk of damage to magnets and/or rotor sections or rotor laminations. Additionally, from an electro-mechanical point of view, certain embodiments angularly shift multiple rotor sections with respect to adjacent rotor sections (e.g., shift by a certain constant angle along the same direction), which causes a large reduction in the amplitude of torque ripple. The reduction in torque ripple results in a concomitant reduction in gearbox size and/or greater safety factor in the motor/gearbox system. FIG. 26 depicts a graph showing torque over time. As shown, the amount of torque ripple is greatly decreased when aspects of the present invention (e.g., step-skewed rotor) are applied to a rotor in an electric machine.

Certain symbols and definitions and concomitant equations are used herein, per the following Table:

| symbol | Definition | equation | |
|---|---|---|---|
| $N_{sect}$ | Number of rotor sections | | |
| $\theta_{zkew}$ | rotor skew angle between the end sections of the entire rotor stack, for reduction of torque ripple | | |
| $\theta_{sect}$ | skew angle between adjacent rotor sections | $\theta_{zect} = \theta_{zkew}/(N_{sect} - 1)$ | Eq. (1) |
| $\theta_{key}$ | constant angle that is required to physically separate the key-bars | $\theta_{key} = \theta_{sect}|\theta_0$ | Eq. (2) |
| $\theta_o$ | additional mechanical offset that allows for the adjacent rotor sections to physically step skew adequately | In one embodiment: $\theta_o = 360/N_{poles}$ | Eq. (3) |
| $N_{poles}$ | Number of rotor poles | | |

In certain embodiments of the present invention the rotor of the IPM machine is divided into $N_{sect}$ axial sections, wherein each section is offset (or skewed) from its 'neighboring', adjacent section with an angle $\theta_{skew}/(N_{sect}-1)$, wherein "$\theta_{skew}$" is the rotor skew angle between the end sections of the entire rotor stack. In this manner, the IPM machine can feature a lower torque ripple than that obtained in the axially straight rotor version. Such torque ripple mitigation will result in lower fatigue on the mechanical parts, thereby improving life of the machine and the various connected mechanical components. Further, because the need to push the magnets through the entire rotor stack is no longer required, the insertion of pre-magnetized magnets is thereby made easier.

In an embodiment, the rotor assembly may use a number $N_{sect}$ of separate rotor sections to reduce the length along which the magnets must be pushed, thus reducing the risk of damage. These pre-assembled $N_{sect}$ sections are then mounted on a motor shaft, resulting in a skewed rotor assembly. In some particular embodiments, compression may be applied to the assembly after compression plates, or other elements, are applied to either end of the rotor assembly.

Additionally, in an embodiment a small angular rotation between adjacent rotor sections is provided that will also help improve the profile of the electromagnetic torque produced by the motor. In fact, the presence of high order harmonics in both stator and rotor fluxes introduces a series of sinusoidally-varying torque components (with zero average value) superimposed to the constant torque that is required. Shifting the various sections of the rotor all by the same angle and in the same direction, the interaction of stator and rotor fluxes will not be the same along the axial length of machine, yet there will be some phase delay between the various sections. By providing a proper shift angle such phase delay can be used to produce equal and opposite sinusoidal torque components acting on the various sections of the rotor, thus filtering out most of the torque ripple yet with little reduction to the average value of torque.

This skew angle, or small angular rotation, between adjacent rotor sections is found in equation [1]:

$$\theta_{sect}=\theta_{skew}/(N_{sect}-1) \quad [1]$$

The proper value of the shifting between the sections should be carefully evaluated for each machine, depending upon its geometry, winding scheme and supply conditions. In one embodiment of the invention, for example, the rotor is 300 mm long and divided into 5 rotor sections, each 60 mm long and shifted 1.25° (i.e., $\theta_{sect}$) from its neighbors. In this particular embodiment, the peak-to-peak ripple is found to be only 6% the average torque, compared to the value of 30% obtained in a case of straight rotor. Meanwhile, the average torque is reduced by just 1%.

Another characteristic of certain embodiments is that in order to accommodate with the shifted rotor sections, the shaft may include many key-bars along the axial length, to lock the rotor sections to the shaft. Such key-bars may be both axially and angularly displaced. In the angular direction such displacement is equal to the required shift between sections, $\theta_{sect}$, to reduce torque ripple plus a constant angle, $\theta_0$, that may be required to physically separate the key-bars enough so as to accommodate the locking of rotor sections to the shaft. For example, in the above mentioned embodiment, each key-bar is displaced by 61.25°. (e.g., $\theta_{key}$=61.25°; $\theta_{sect}$=1.25°; $\theta_0$=60°). This total angle between adjacent keybars, $\theta_{key}$, is shown in equation [2]:

$$\theta_{key}=\theta_{sect}+\theta_0 \quad [2]$$

$\theta_0$ is an additional mechanical offset that allows for the adjacent rotor sections to more easily physically accommodate the step skewing in relation to each other more easily. In a particular embodiment, $\theta_0$ is related to the quantity of rotor poles $N_{poles}$ in the rotor assembly. In particular embodiments the value $\theta_0$ is found in equation [3]:

$$\theta_0=360/N_{poles} \quad [3]$$

In other embodiments, $\theta_0$ may be virtually any value and wholly unrelated to quantity of poles. In certain embodiments, $\theta_0$ may even have a value of zero (0).

In another embodiment of the present invention, the rotor sections 660 (e.g., solid core or rotor laminations) may feature, on their inner diameter, a series of equally displaced notches to provide proper mating with the key-bars as well as a guide for the section shifting.

Figure 27:
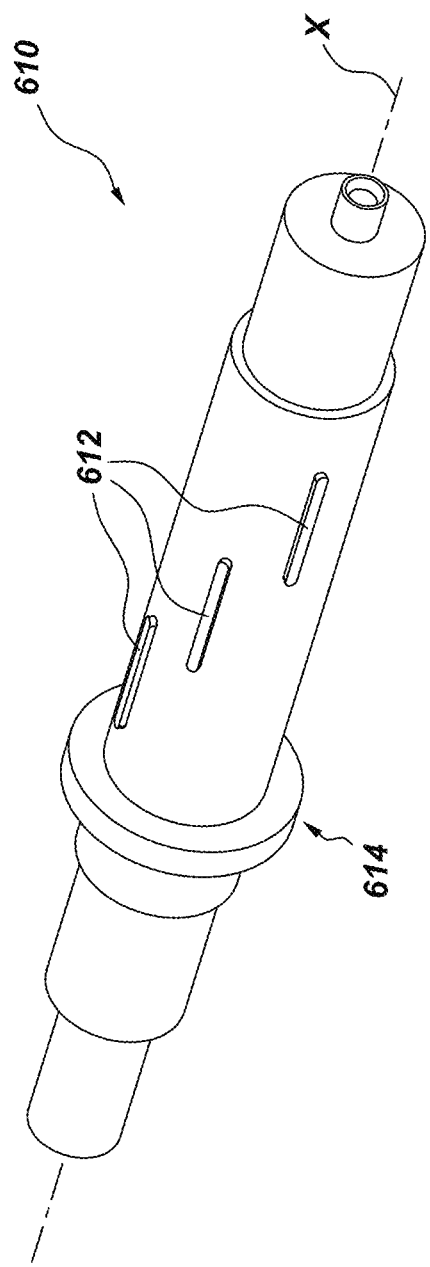
FIG. 27 is a perspective view of a rotor shaft component, according to an embodiment of the present invention.

Referring to FIG. 27, a perspective view of a rotor shaft component, according to an embodiment, is shown. The rotor shaft component, or axle, is shown as 610. As will be discussed herein the axle 610 may be used in coordination with a rotor assembly; a stator; and, thereby in combination be part of an electric machine. The axle 610 may comprise a longitudinal element, or axle, along a longitudinal axis, denoted X. Depending on the embodiment, the axle 610 may further comprise one or more end elements 614 that aid in the use of the axle 610 with the various rotor sections as discussed herein. The length of the axle 610 further comprises a plurality of keybars 612 extending from the body of the axle 610.

The quantity of keybars 612 may vary depending on the configuration of the rotor assembly and/or electric machine that it is used in combination with. The quantity may be any quantity from two to virtually infinite, although it is envisioned that a typical quantity of keybars 612 for many, but not all, embodiments is in the magnitude of between three and ten keybars 612 along the axle 610. The location and configuration of the plurality of keybars 612 is significant in that they aid in providing for the skewing of various rotor sections thereon as discussed herein. The plurality of keybars 612 are configured to match with corresponding plurality of notches on a plurality of rotor sections to provide the step skewing of rotor sections, and, in certain embodiments, continuous skewing of rotor laminations. The plurality of keybars 612 is located so that they are distributed axially along and circumferentially around the shaft of the axle 610. The plurality of keybars 12 are substantially parallel to the longitudinal axis, X. That is the midpoints of plurality of keybars 612 would define a helical, or helicoidal, pattern around and along the axle 610. In an embodiment, a portion of each keybar 612 may overlap, or extend partially, in the axial length with another adjacent keybar 612. Although FIG. 27 shows straight keybars 612, in other embodiments, other shapes and configuration of keybars 612 may be used, including for example helical-shaped keybar(s). (See e.g., FIG. 33).

Various methods for manufacturing the component 610 may be used in various embodiments. For example, the various elements (e.g., 612, 614) of the component 610 may be created by the removal of material from a single, or multiple, ingot elements. In another embodiment, material may be removed along the shaft of the axle 610 so as to define voids, or recesses, configured to receive separate keybar elements, or protrusions, 612 that could be fixedly, or removably, attached to the plurality of voids. In still other embodiments, various elements (e.g., 612, 614, and the like) may be attached via other means and manners.

Figure 31:
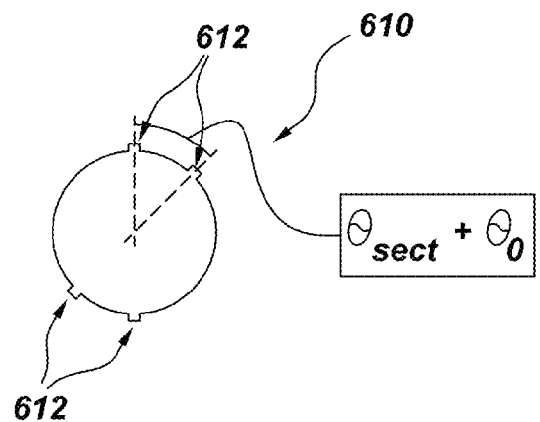
FIG. 31 is an end view of a rotor shaft component, according to an embodiment of the present invention.
Figure 32:
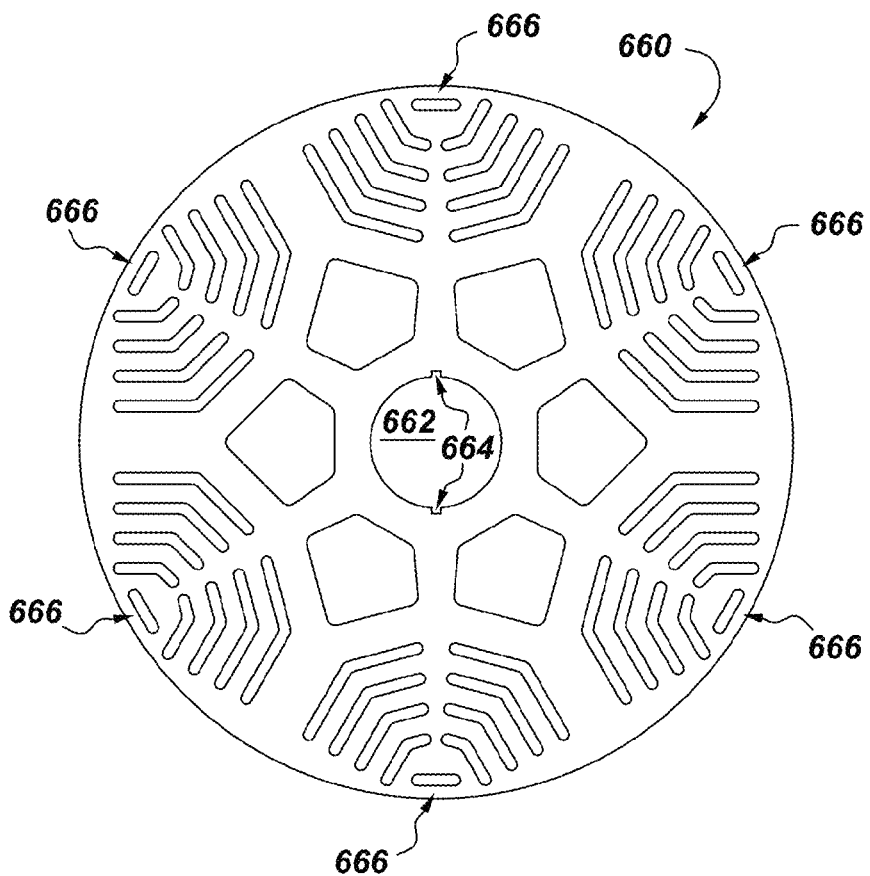
FIG. 32 is a top view of a rotor section, according to an embodiment of the present invention.

Referring to FIG. 31 along with FIG. 27, an end view of an embodiment of a section of the axle 610 is shown. FIG. 31 is showing the key bars 612 configured for two adjacent rotor sections (not shown). The offset angle between the adjacent key bars 612 is depicted as $\theta_{key}$, wherein $\theta_{key}=\theta_{sect}+\theta_0$, wherein $\theta_{key}$ comprises an electrical offset suitable to reduce torque ripple by at least partially cancelling out ripple components in the adjacent rotor sections, and further wherein $\theta_0$ comprises the additional mechanical offset that allows for the physical accommodation of adjacent rotor sections to step skew adequately. As shown, two keybars for two corresponding rotor sections (not shown) are shown at approximately "12 o'clock" and "2 o'clock". In the embodiment shown, the keybars for the other rotor sections of the rotor assembly are omitted for purposes of clarity. In the particular embodiment shown, additional balancing keybars 612 are shown and located 180° from the two key bars 612. Thus, the two balancing keybars 612 are shown at approximately "6 o'clock" and "8 o'clock". The embodiment shown (along with the omitted keybars) would be a suitable axle 610 for use, for example, in a 6-pole IPM or Synchronous Reluctance Machine. The shaft keybars 612 in the axle 610 of FIG. 31 are configured to match corresponding keybar notches 664 shown in the inner opening 662 of the rotor section 660 shown in FIG. 32. By way of example only, the 6 rotor poles of the rotor section 660 of FIG. 32 when used with the axle 610 depicted would results in offsets between adjacent rotor sections 660 of 1.25°.

Figure 29:
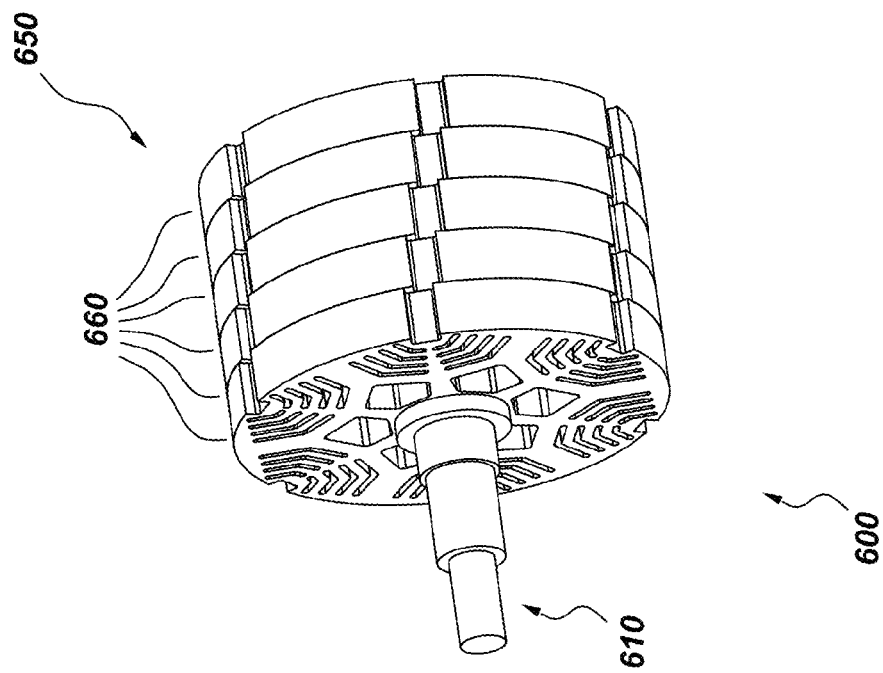
FIG. 29 is a perspective view of the completed assembly of FIG. 28, according to an embodiment of the present invention.
Figure 28:
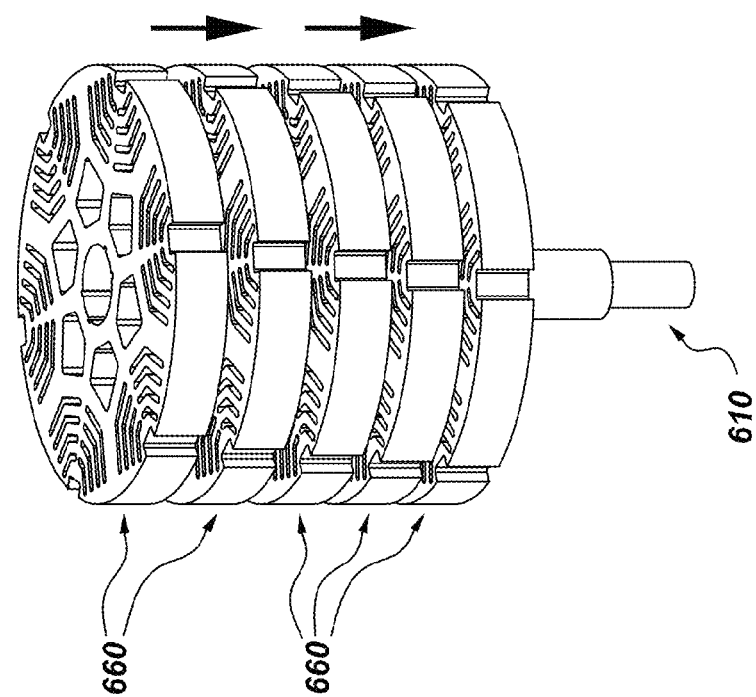
FIG. 28 is a perspective exploded view of the assembling of rotor structure components and the rotor shaft component of FIG. 27, according to an embodiment of the present invention.

Referring to FIGS. 28 and 29, a plurality of rotor sections 660 are shown being assembled along an axle shaft 610 to form a rotor assembly 650 in FIG. 28 and shown completely assembled in FIG. 29. The rotor stack, or assembly, 650 comprises a plurality of pre-manufacture rotor sections 660, assembled together on the shaft 610. In an embodiment, each of the plurality of rotor sections 660 is installed in a step-skewed configuration. Two skewing options include both a 1-slot pitch and half-slot pitch angular displacement between the two ends of the rotor stack 650. The angular rotation between two consecutive rotor sections 660 can be calculated from Equation [1] stated in the Table above.

An analysis has been conducted while delivering rated torque, the condition when the absolute value of the torque ripple is largest and, thus, more harmful to the mechanical components connected to the shaft. The rotor assembly 650 has been assumed being made of five (5) rotor sections 660.

As shown in FIGS. 28 and 29, each rotor section 660 may be premanufactured. The rotor sections 660 are each place in a skewed fashion on the axle 610. As every rotor section 660 has a corresponding keybar 612, the plurality of rotor sections 660 comprise a rotor assembly, or stack 650. Thus, for an electric machine (e.g., IPM or Synchronous Reluctance Machine) the angular offset between consecutive keybars 612 can be found from equation [2], stated above and found in the Table.

Figure 30A:
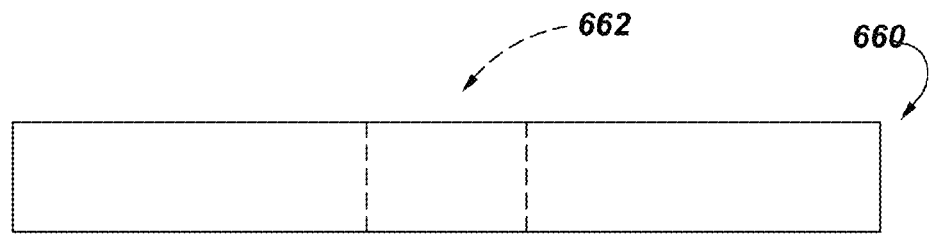
FIG. 30A is a side elevation view of a solid rotor core section, according to an embodiment of the present invention.
Figure 30B:
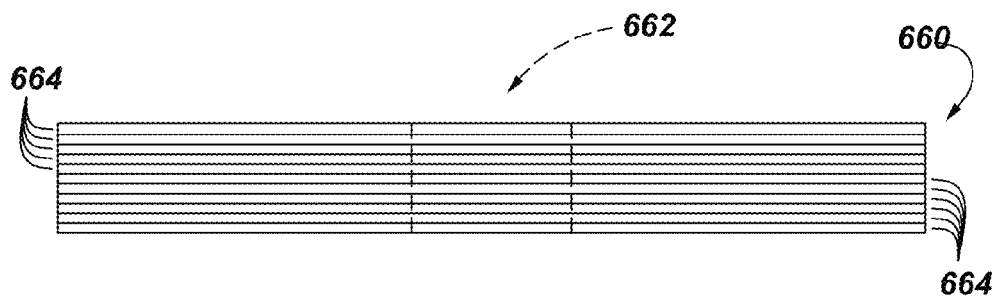
FIG. 30B is a side elevation view of a rotor core section comprised of a plurality of rotor laminations, according to an embodiment of the present invention.

Referring to FIGS. 30A and 30B, two embodiments of a rotor section 660 are shown according to embodiments of the present invention are shown in elevation views. The first embodiment (FIG. 30A) depicts a single rotor section 660 that includes an opening 662 therethrough and further comprises a solid core rotor core section. The second embodiment (FIG. 30B) depicts a single rotor section 660 that similarly includes an opening therethrough, but contrastingly further comprises a plurality of rotor laminations 664. It should be apparent that the quantity of rotor laminations 664 may vary from the embodiment depicted in FIG. 30B. Further, the rotor laminations 664 may be fixedly attached to each other to form the particular separate rotor sections 660. Still further, in other embodiments, the rotor laminations 664 may be freely stacked (e.g., non-fixedly attached) with the particular rotor sections 660.

Figure 33:
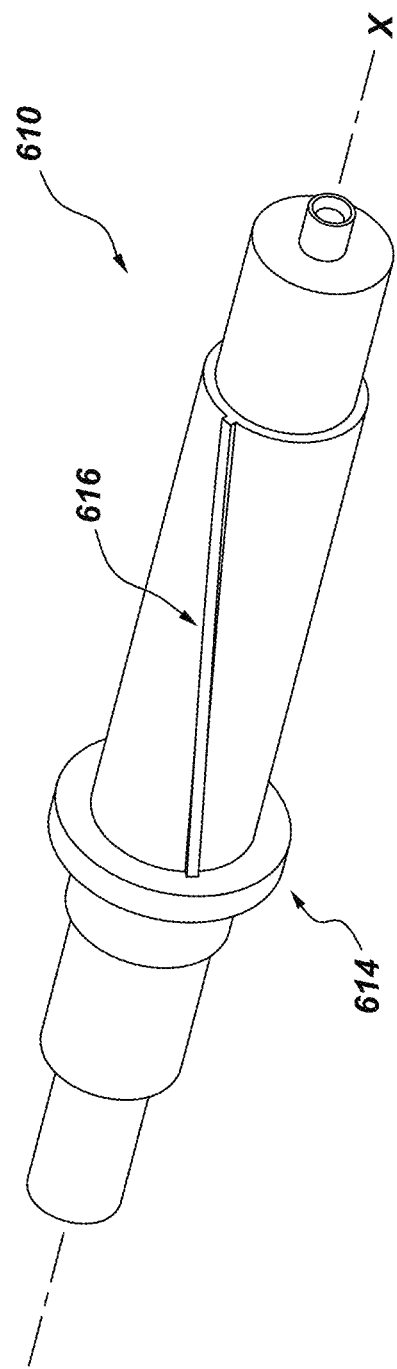
FIG. 33 is a perspective view of a rotor shaft component, according to another embodiment of the present invention.

Referring to FIG. 33, another embodiment of a rotor axle component 610 is shown in perspective view. As depicted, the axle component 610 may include an end element 614 that aids in the keeping of the rotor sections 660 thereon. In the embodiment shown, the axle 610 further comprising a keybar 616 configured in a continuous helical profile, as opposed to the straight keybars 612 shown, for example in FIG. 27. Depending on the embodiment, the helical keybar 616 may be a single keybar configured in a continuous helicoidal pattern partially around the shaft of the axle component 610. In another embodiment, two continuous helical keybars 616 may be located 180° opposite each other on the shaft of the axle component 610. In this manner, the two helical keybars 616 act as balancing keybars to each other.

In an embodiment of the present invention the rotor axle component 610 depicted in FIG. 33 may be used with rotor sections 660 as those depicted in FIG. 30B. That is the plurality of rotor sections 660 each comprised of a plurality of rotor laminations 664 may be placed on the axle component 610 having at least one continuous helical keybar 616. In another embodiment, the rotor axle component 610 depicted in FIG. 33 may be used with rotor sections 660 as those depicted in FIG. 30A. That is the plurality of rotor sections 660 each comprise solid core rotor sections and may be placed on the axle component 610 having at least one continuous helical keybar 616. In this manner, the rotor stack, or assembly, will have a continuously skewed configuration amongst the plurality of rotor sections 660.

A method of assembling a rotor core assembly may include assembling each of the rotor core sections on a keyed axle shaft, as discussed herein. The keyed axle shaft, depending on the embodiment, may have one or more keys thereon. The key(s) accommodate the multiple rotor sections, thereby defining a skewed (continuous or step-skewed) rotor core stack assembly. The rotor core stack assembly may have a compressive force applied to it. In an embodiment, one or more compression plates may be first adjoined to one, or both, end(s) of the rotor core stack assembly, prior to compression. In the IPM embodiment, a plurality of magnets may be inserted through the rotor core sections and affixed to the rotor core sections. In an embodiment, the affixing of magnets may be done by one of: infusing a resin on the rotor core sections; clamp the magnets with a filler or wedge material; and, shrinking the magnets into the rotor core sections. The method is suitable for IPM or Synchronous Reluctance motor (with exception of magnets; step or continuous skewed configurations; and, solid core or plurality of lamination rotor sections.

Under aspects of the present invention, the components 610, 660 and assemblies 650 and the electric machines 600 discussed herein may be used as a traction motor for virtually any vehicle. A vehicle support frame (not shown) may be connected to the one or more electric machine 600. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

Note that while various embodiments discussed herein describe the improvements to be used in and with IPM, it should be apparent that the various aspects of the present are equally suited for use in and with Synchronous Reluctance machines.

Aspects of the present invention permit the mounting of one, or more, D-rings in skewed rotor assemblies of motors thereby allowing for enhanced encoderless control of the motor along with a reduction in torque ripple. By using encoderless control or sensorless control, the expense and faultiness position encoders are prone towards is avoided, thereby reducing both cost and increasing reliability of the drive. By combining the encoderless feature with a skewed rotor assembly, a smoother torque profile with low ripple is achieved. Ultimately, improved motor performance coupled with simplified mechanical design of the other drivetrain components (e.g., gearbox, shaft) is reached.

Figure 34:
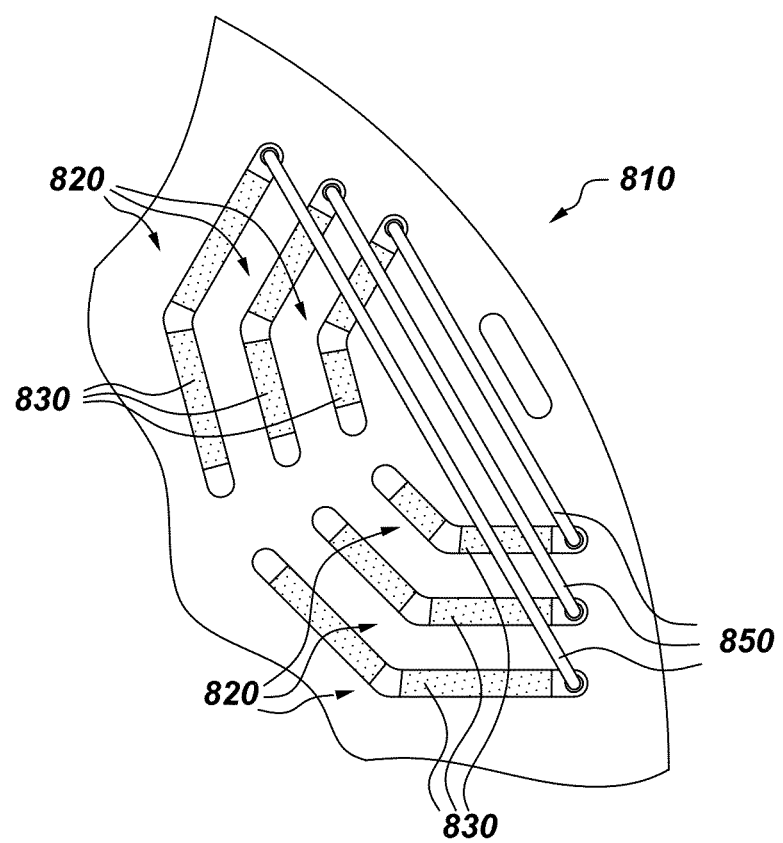
FIG. 34 is a top view of a portion of a rotor section according to an embodiment of the present invention.

Referring to FIG. 34, a top view of a portion of a rotor section 810 according to an embodiment of the present invention is depicted. The rotor section 810 may comprise a plurality of void rows 820 therethrough. As shown the plurality of void rows 820 may be radially distributed in each of the plurality of poles. Depending on the embodiment, the plurality of void rows 820 may or may not have a plurality of magnets 830 located therein. In the embodiments that do use magnets 830, the plurality of magnets 830 residing in the plurality of void rows 820 will thus define a plurality of magnet 830 rows being radially distributed, as well.

As discussed herein, an assembly 800, or rotor assembly, will comprise a plurality of the rotor sections 810, wherein the rotor sections 810 are skewed in a circumferential direction. Similarly, depending on the particular embodiment and as disclosed herein, each of the plurality of rotor sections 810 may either comprise a solid rotor section or a plurality of rotor laminations. So too, the type of skewing of the plurality of rotor sections 810 may be described as either step-skewed or continuously skewed, depending on the embodiment. While embodiments having a continuously skewed configuration of rotor sections 810 may have rotor laminations in each rotor section 810, other embodiments having a continuously skewed configuration may alternatively have solid rotor core sections for each of the plurality of rotor sections 810. Similarly, while some embodiments having a stepped skewed configuration of rotor sections 810 may have solid core rotor sections for each rotor section 810, other embodiments having a stepped skewed rotor configuration may alternatively have a plurality of rotor core laminations for each of the plurality of rotor sections 810.

As shown in FIG. 34 for example, at an end of each void row 820, a conductive element passes therethrough. The conductive element is connected to itself, thereby defining a conductive ring 850. In this manner the conductive rings 850 are each short-circuited. In this manner, each of the conductive rings may substantially surround the plurality of void rows 820 (with or without magnets). As shown in FIG. 34, the conductive ring 850 may pass through the remaining space 822 (See e.g., FIGS. 36-39) of the void 820 left at the end of the placement of the magnets 830. In this manner, the plurality of conductive rings 850 is co-located with the plurality of magnets 830 in the plurality of void rows 820. As discussed herein, via any suitable means, the conductive ring 850 should not be in contact with the plurality of magnets 830 and/or the adjacent rotor section 810. A general configuration for the location of the plurality of conductive rings 850 is such that a magnetic axis of the conductive ring(s) 850 is to coincide with a d-axis of the rotor assembly 800.

While FIG. 34 shows a quantity of three rows of voids 820 and three conductive rings 850, there are other combinations and configurations possible. For example, every row of voids does not have to receive a conductive ring. Given the quantity of conductive rings, R, and the quantity of void rows, L, the assembly may be configured such that R≤L. Similarly, FIG. 34 only shows a single pole portion of a machine. Aspects of the present invention can be used with virtually any skewed rotor assembly.

The material, or combination of materials, used for the conductive rings 850 may be any suitable electrically conductive material(s). The conductive rings 850 may comprise a solid conductor (e.g., copper, aluminum, etc.) or a stranded conductor (e.g., Litz wire, etc.) or a combination thereof.

Referring further to FIG. 36, an end sectional view of a portion of a rotor section 810 according to an embodiment of the present invention is depicted. The embodiment shown is termed a "stepped-skew" configuration. As shown, a portion of the conductive ring 850 passes through the end of the void 822 and, if magnets 830 are used (as shown), adjacent to the magnets 830. As with the plurality of rotor sections 810 that are skewed (stepped or continuously), portions of the conductive ring 850 are skewed as well. The sectional views through various portions of the conductive ring in FIG. 36 are shown further at FIGS. 37A-37C. As illustrated, the angling of the conductive ring 850 may match, or be approximately parallel to, the skewing of the rotor sections 810. The portion of the conductive ring 850 that passes through the end of the void row 822 may be straight (see e.g., FIG. 36). In other embodiments, portions of the conductive ring 850 may be not straight (e.g., stepped, etc.).

Figure 38:
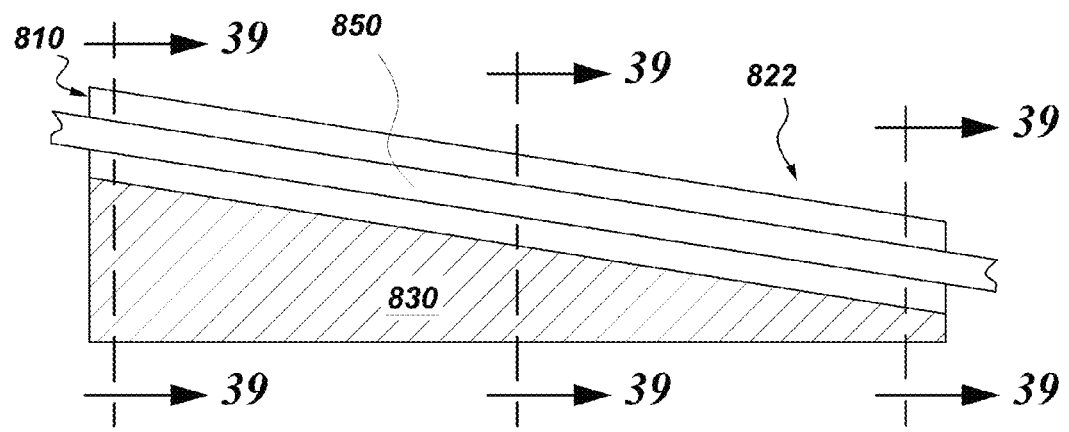
FIG. 38 is a sectional view of a portion of a rotor assembly having a continuously skewed configuration, according to another embodiment of the present invention.
Figure 39:
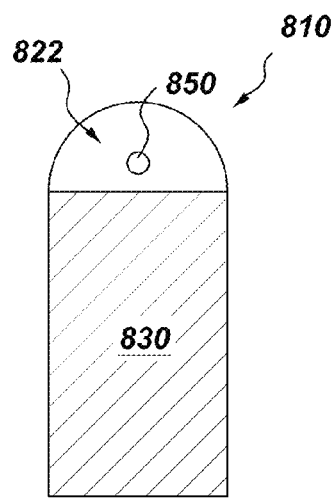
FIG. 39 is a sectional view of certain portions of the rotor assembly embodiment shown in FIG. 38.

Referring further to FIG. 38, an end sectional view of a portion of a rotor section 810 according to another embodiment of the present invention is depicted. The embodiment shown is termed a "continuous-skewed" configuration. As shown, a portion of the conductive ring 850 passes through the end of the void 822 and, if magnets 830 are used (as shown), adjacent to the magnets 830. As with the plurality of rotor sections 810 that are skewed (stepped or continuously), portions of the conductive ring 850 are skewed as well. The sectional views through various portions of the conductive ring in FIG. 36 are shown further at FIG. 39. Unlike the embodiment shown in FIG. 36-37C, the spacing between the conductive ring 850 and the near magnets 830 and rotor sections 810 is substantially uniform along all lengths of the conductive ring 850. As illustrated, the angling of the conductive ring 850 may match, or be approximately parallel to, the continuously skewing of the rotor sections 810. The portion of the conductive ring 850 that passes through the end of the void row 822 may be straight (see e.g., FIG. 38). In other embodiments, portions of the conductive ring 850 may be not straight (e.g., stepped, etc.).

Depending on the embodiment, a non-conductive spacer element may at least partially surround portions of the conductive ring 850. For example, as shown in FIGS. 34-39, a non-conductive spacer element may completely surround the conductive ring along the portion of the conductive ring 850 that passes through the rotor sections 810. The non-conductive spacer element may comprise any suitable electrically non-conductive material or combination of materials. As shown in FIGS. 37A-37C for example, the non-conductive spacer element may comprise a plastic filler element, resin material, and the like. In an embodiment, air or non-conductive fluid may act as the non-conductive spacer element. In embodiments where plastic filler element is used as the non-conductive spacer element, a bore may be through the plastic filler element configured to receive the conductive ring 850. In still other embodiments, partial non-conductive elements may be inserted in the void space 822 prior to, or concurrent with, the insertion of the conductive element into the void space 822. Then, after the conductive element is situated, a non-conductive material (e.g., resin, etc.) is placed (e.g., injected) in the void space 822 thereby fixing the location of the conductive ring 850 within the void space 822 so that, during use, the conductive ring 850 does not contact the adjacent rotor section 810.

Various methodologies may be employed to construct the skewed rotor assembly having the d-ring implementation of the conductive rings. For example, referring to FIG. 35A, an exploded view of a rotor assembly 800 and conductive ring 850 according to an embodiment of the present invention is depicted. As illustrated, a skewed rotor assembly 800 may then receive the plurality of conductive elements 850 through the void ends in the rotor sections 810. Once the conductive elements have passed fully through the skewed rotor assembly 800, the conductive elements 850 are bent to align with the ends (or end plates) of the rotor assembly 810. The two ends of the bent conductive elements are then attached to each other by any suitable means so as to define a conductive ring 850. For example, the element ends may be brazed together or mechanically attached to each other via clamping, for example, and the like.

Figure 35A:
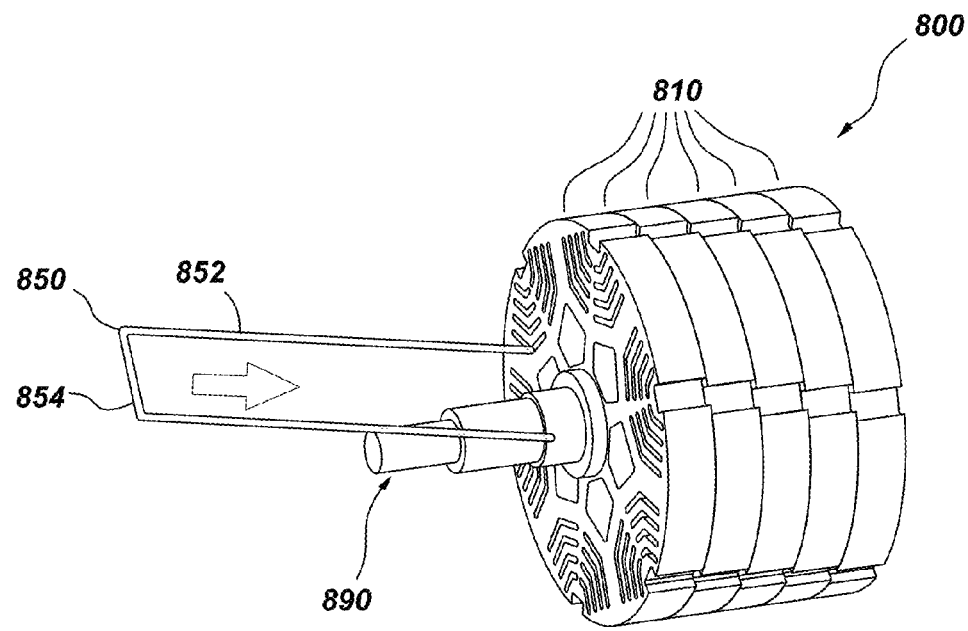
FIG. 35A is an exploded view of a rotor assembly and conductive ring according to an embodiment of the present invention.
Figure 35B:
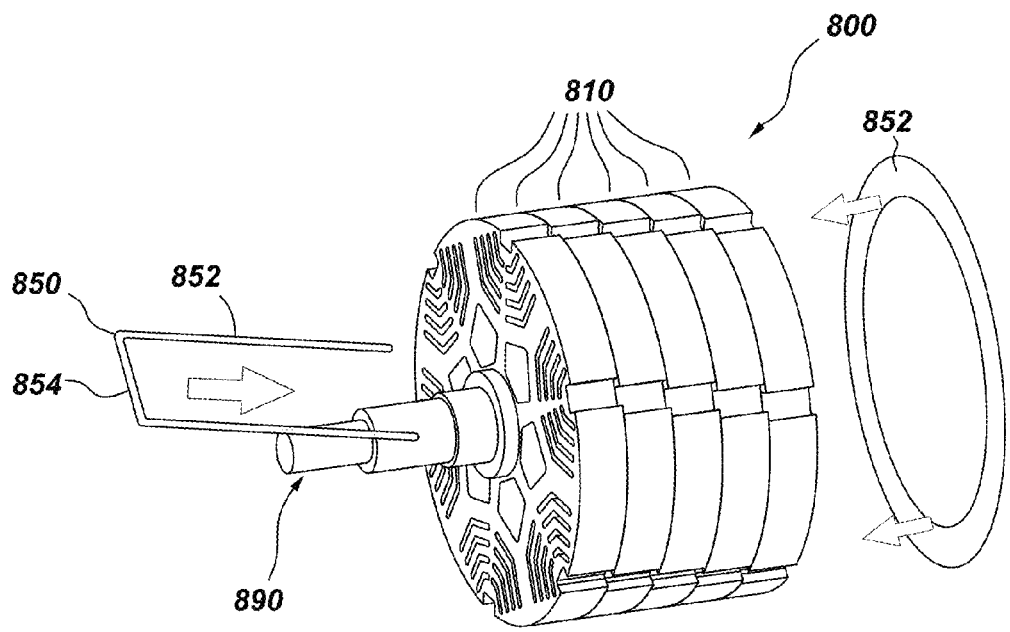
FIG. 35B is an exploded view of a rotor assembly and conductive ring according to another embodiment of the present invention.

As shown in FIG. 35B, the conductive element 850 comprising two legs 852 and an end portion 854 may be inserted through the rotor assembly 800, which comprises the plurality of rotor sections 810. At the distal end of the rotor assembly 800, the ends 852 may contact and be connected to a conductive end ring 852, thereby defining one or more conductive rings 850.

Figure 40:
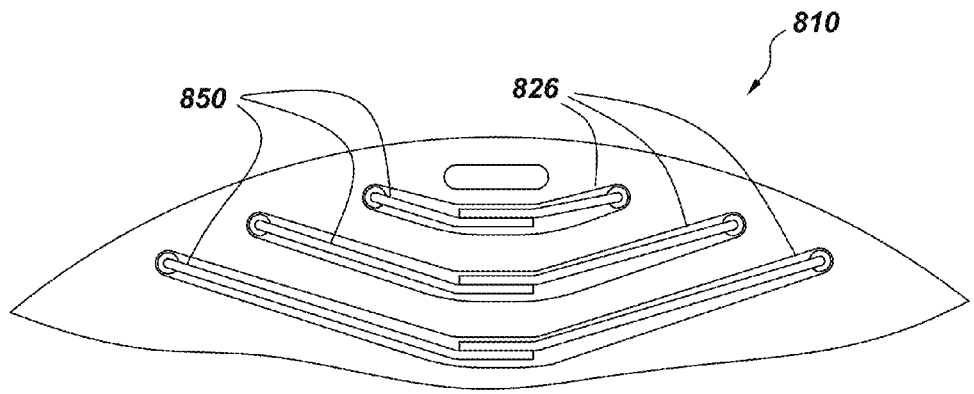
FIG. 40 is an end view of a portion of the rotor assembly and plurality of conductive rings shown in FIG. 35A.

Referring to FIG. 40, an end view of a portion of the rotor assembly 800 and conductive ring 850 now formed is depicted. The connected ends of conductor rings 850 may be embedded, or recessed, in recesses 826 of the end plates. Depending on the embodiment, after the connecting of the conductor elements and forming of conductor rings 850, a resin material may be inserted (e.g., injected) into any remaining voids between the conductor rings 850 and rotor sections 810 (and magnets, if applicable) so as to fix the assembly and assist in preventing the conductor rings 850 from making electrical contact with adjacent rotor sections 810, during subsequent operation.

Figure 41:
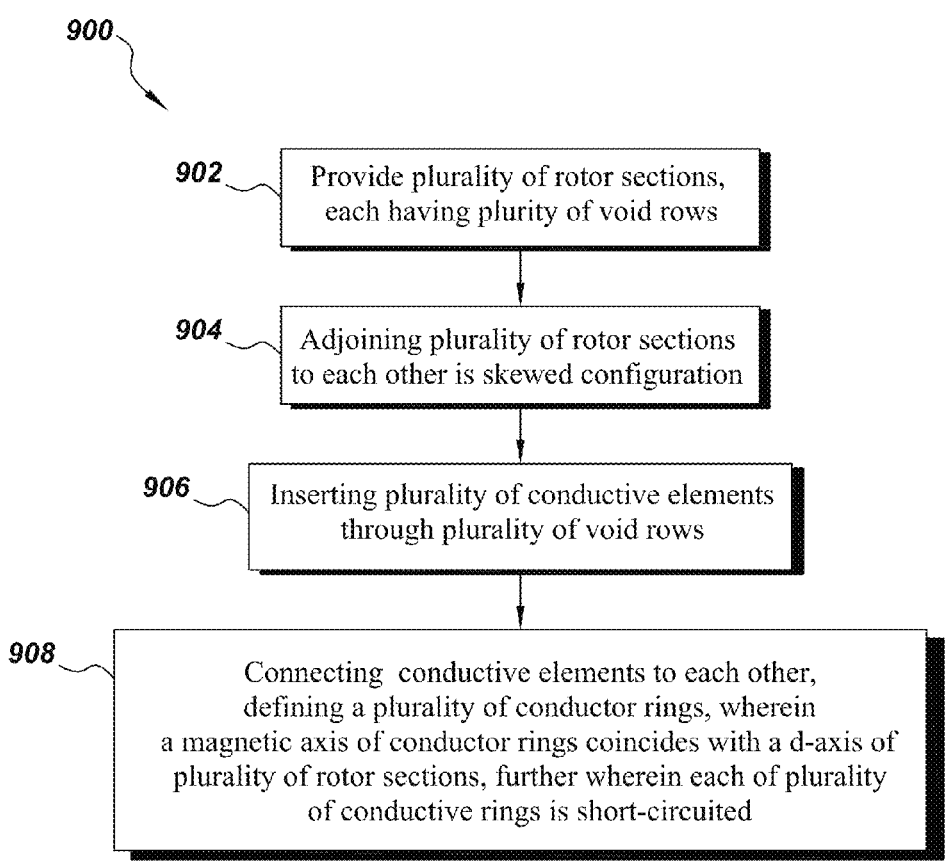
FIG. 41 is a flowchart depicting a method of assembly according to an embodiment of the present invention.

Referring to FIG. 41, a flowchart of a method of assembly according to an embodiment of the present invention is depicted. The method, 900, may include, at 902, providing a plurality of rotor sections, wherein each of the rotor sections has a plurality of void rows. At 904, the plurality of rotor sections is adjoined to each other in a skewed configuration. At 906, a plurality of conductive elements are inserted through the plurality of void rows. Then, at 908, the conductive elements are connected to each other so as to define a plurality of conductive rings, wherein a magnetic axis of the plurality of conductive rings coincides with a d-axis of the plurality of rotor sections, further wherein each of the plurality of conductive rings is short-circuited.

The rotor assembly constructed herein may be used in an assembly with a stator assembly so as to construct an electrical machine. The resultant electrical machine may be used in a variety of uses including, but not limited to, as traction motors or motive motors for vehicles. Clearly, the electrical machines that use the improvements discussed herein may have purposes other than use in vehicles.

It should be apparent that various embodiments beyond those discussed and/or illustrated herein may be used under aspects of the present invention. For example, as discussed herein, the plurality of conductive rings may be configured such that they comprise a rotor cage (see e.g., FIGS. 5B, 7B, 9B, etc.). The rotor cage, depending on the embodiment, may be skewed to match the skewing of the attendant skewed rotor assembly.

Similarly, while various embodiments illustrated and discussed herein relate to the use of the rotor assembly in a radial-flux type electric motor, aspects of the present invention may be used in other types of motors. By way of example, and not limitation, the skewed rotor assembly disclosed herein may be used in axial flux motors, dual stator motors, inside rotor motors, outside rotor motors, and the like. For example, the stator assembly of a machine may surround the rotor assembly; be surrounded by the rotor assembly; or, be adjacent to the rotor assembly.

Similarly, while aspects of the present invention can certainly be used in Synchronous Reluctance machines and IPM machines of the multi-layer type as shown herein, the aspects may also be used, for example, in spoke-type and single layer type machines of the Synchronous Reluctance and IPM type.

In all the embodiments, torque ripple is effectively reduced. Further, electric machines that use aspects of the invention can operate without the need for using an encoder.

Therefore, according to one embodiment of the present invention, an assembly comprises a plurality of adjoined rotor sections having a plurality of poles, further having a plurality of void rows therethrough, wherein the plurality of layers are radially distributed in each of the plurality of poles, wherein the plurality of rotor sections are skewed in a circumferential direction; and, a plurality of conductive rings, wherein a portion of each of the plurality of conductive rings substantially surround one of the plurality of void rows.

According to another embodiment of the present invention, a method comprises providing a plurality of rotor sections, each having a plurality of void rows; adjoining the plurality of rotor sections to each other in a skewed configuration; and, inserting a plurality of conductive element through the plurality of void rows; and, connecting the conductive elements to each other thereby defining a plurality of conductive rings, wherein a magnetic axis of the plurality of conductive rings coincides with a d-axis of the plurality of rotor sections, further wherein each of the plurality of conductive rings is short-circuited.

According to another embodiment of the present invention, a motor comprising a rotor assembly comprising: a plurality of rotor sections, wherein the plurality of rotor sections are skewed in a circumferential direction, having a plurality of voids therethrough; and a plurality of conductive rings, wherein a magnetic axis of each of the plurality of conductive rings is coincident with a d-axis of the plurality of rotor sections; and a stator assembly one of: surrounding the rotor assembly; surrounded by the rotor assembly; and adjacent the rotor assembly While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. An assembly comprising:
a plurality of adjoined rotor sections having a plurality of poles and a plurality of void rows therethrough, wherein a plurality of void rows are radially distributed in each of the plurality of poles;
a rotor bar extending through the plurality of adjoined rotor sections, the rotor bar including a longitudinal axle having a plurality of keybars extending outward from a surface of the longitudinal axis, wherein each of the plurality of keybars are disposed axially along and circumferentially around the longitudinal axle, and wherein an axis of the plurality of keybars is parallel to the longitudinal axle, and wherein a portion of each of the plurality of keybars overlap an adjacent keybar in the circumferential direction, and wherein each of the plurality of keybars are configured to receive a corresponding key on a corresponding rotor section of the plurality of adjoined rotor sections, thereby defining a stacked rotor assembly having a step-skewed configuration; and a plurality of conductive rings, wherein a portion of each of the plurality of conductive rings substantially surround one of the plurality of void rows; and wherein a portion of each of the plurality of conductive rings are inserted into a void space such that, during use, each conductive ring does not contact an adjacent rotor section.

2. The assembly of claim 1, further comprising a plurality of magnets located in the plurality of void rows, thereby defining a plurality of magnet rows being radially distributed.

3. The assembly of claim 2, wherein at least a portion of the plurality of conductive rings are co-located with the plurality of magnets in the plurality of void rows.

4. The assembly of claim 2, each of the plurality of conductive rings having four sides and each of the plurality of magnet rows have ends, wherein at least two of the four sides of the conductive rings adjoin the ends of the plurality of magnet rows.

5. A motor machine comprising:
the assembly of claim 2;
a stator surrounding the assembly; and
a shaft therethrough.

6. The motor machine of claim 5, wherein the motor machine comprises an Interior Permanent Magnet (IPM) machine.

7. A vehicle comprising the motor machine in claim 5 and a vehicle support structure.

8. The assembly of claim 1, wherein each of the plurality of conductive rings comprise a plurality of lengths, wherein at least two lengths are stepped.

9. The assembly of claim 1, wherein the plurality of rotor sections is continuously skewed.

10. The assembly of claim 1, wherein each of the plurality of rotor sections comprise solid core sections.

11. The assembly of claim 1, wherein each of the plurality of rotor sections comprise a plurality of rotor laminations.

12. The assembly of claim 1, wherein a quantity of the plurality of conductive rings, R, and a quantity of plurality of void rows, L, further wherein the component is configured such that $R \leq L$.

13. The assembly of claim 1, wherein the plurality of conductive rings is comprised of a solid conductor.

14. The assembly of claim 1, wherein the plurality of conductive rings is comprised of a stranded conductor.

15. The assembly of claim 1, further comprising a non-conductive spacer element that at least partially surrounds the conductive ring.

16. The assembly of claim 15, wherein the non-conductive spacer element comprises a plastic filler having a bore therethrough.

17. The assembly of claim 15, wherein the non-conductive spacer element comprises a resin material.

18. The assembly of claim 1, wherein a magnetic axis of one of the plurality of conductive rings is coincident with a d-axis of the assembly.

19. The assembly of claim 1, wherein the plurality of conductive rings comprises a rotor cage.

20. The assembly of claim 19, wherein the rotor cage further comprises at least one conductive end ring and a plurality of conductive elements connected thereto.

21. A motor machine comprising:
the assembly of claim 1;
a stator surrounding the assembly; and
a shaft therethrough.

22. The motor machine of claim 21, wherein the motor machine comprises a Synchronous Reluctance machine.

23. A vehicle comprising the motor machine in claim 21 and a vehicle support structure.

24. A motor comprising:
a stacked rotor assembly having a step-skewed configuration, the rotor assembly comprising:
a longitudinal axle having a plurality of keybars extending outward from a surface of the longitudinal axle, wherein each of the plurality of keybars are disposed axially along and circumferentially around the longitudinal axle, further wherein an axis of the plurality of keybars is parallel to the longitudinal axle, wherein a portion each of the plurality of keybars overlap an adjacent keybar in a circumferential direction, wherein each of the plurality of keybars are configured to receive a corresponding key on a corresponding rotor section of a plurality of rotor sections;
a plurality of rotor sections having a plurality of voids therethrough, wherein the plurality of voids comprises a plurality of void rows radially distributed in each of the plurality of poles; and
a plurality of conductive rings, wherein a magnetic axis of each of the plurality of conductive rings is coincident with a d-axis of the plurality of rotor sections; and
a stator assembly
surrounding the rotor assembly.

25. The motor of claim 24 further comprising an axle therethrough at least one of the rotor assembly and the stator assembly, configured to rotate the rotor assembly.

26. The motor of claim 24, wherein plurality of conductive rings comprises a rotor cage.

27. The motor of claim 26, wherein the rotor cage further comprises at least one end ring and a plurality of conductive elements electrically connected to the end rings.

28. The motor of claim 24, the rotor assembly further comprising a plurality of magnets therein.

29. The motor of claim 24, wherein the plurality of voids comprises a single void row.

30. The motor of claim 24, wherein the plurality of voids comprises a single void per pole.

31. The motor of claim 24, wherein plurality of voids comprises a plurality of voids per pole.

* * * * *